(12) United States Patent
Mukawa

(10) Patent No.: US 10,539,793 B2
(45) Date of Patent: Jan. 21, 2020

(54) HEAD MOUNTED IMAGE DISPLAY DEVICE AND DISPLAY DEVICE

(71) Applicant: Sony Corporation, Tokyo (JP)

(72) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 14/612,484

(22) Filed: Feb. 3, 2015

(65) Prior Publication Data

US 2015/0226970 A1 Aug. 13, 2015

(30) Foreign Application Priority Data

Feb. 10, 2014 (JP) ................................. 2014-023137

(51) Int. Cl.
| | |
|---|---|
| *G02B 27/01* | (2006.01) |
| *F21V 8/00* | (2006.01) |
| *G02B 5/30* | (2006.01) |
| *H04N 9/31* | (2006.01) |

(52) U.S. Cl.
CPC ........... *G02B 27/0172* (2013.01); *G02B 5/30* (2013.01); *G02B 6/0031* (2013.01); *G02B 27/017* (2013.01); *H04N 9/3167* (2013.01); *G02B 2027/0112* (2013.01); *G02B 2027/0118* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 8,411,134 | B2 | 4/2013 | Tomita |
| 8,570,242 | B2 | 10/2013 | Chosokabe et al. |
| 8,797,433 | B2 | 8/2014 | Kaizu et al. |
| 8,861,090 | B2 | 10/2014 | Mukawa |
| 8,976,453 | B2 | 3/2015 | Akutsu et al. |
| 8,988,315 | B2 | 3/2015 | Mukawa et al. |
| 9,016,864 | B2 | 4/2015 | Sasazaki et al. |
| 9,164,221 | B2 | 10/2015 | Akutsu et al. |
| 9,311,752 | B2 | 4/2016 | Chosokabe et al. |
| 9,451,244 | B2 | 9/2016 | Sasazaki et al. |
| 9,488,846 | B2 | 11/2016 | Hayashi |
| 9,558,540 | B2 | 1/2017 | Mukawa |
| 9,606,354 | B2 * | 3/2017 | Spitzer ............... G02B 27/0101 |
| 9,658,456 | B2 | 5/2017 | Mukawa |
| 9,726,890 | B2 | 8/2017 | Akutsu et al. |

(Continued)

FOREIGN PATENT DOCUMENTS

| | | |
|---|---|---|
| JP | 2006-162767 A | 6/2006 |
| JP | 2007-094175 A | 4/2007 |

OTHER PUBLICATIONS

U.S. Appl. No. 13/053,697, filed Mar. 22, 2011, Mukawa et al.

(Continued)

*Primary Examiner* — Kent W Chang
*Assistant Examiner* — Benjamin Morales
(74) *Attorney, Agent, or Firm* — Wolf, Greenfield & Sacks, P.C.

(57) ABSTRACT

There is provided an image display device including (A) an image forming device, (B) an optical device configured to receive incident light output from the image forming device and output the incident light, and (C) a light receiving device configured to detect the light output from the image forming device.

16 Claims, 22 Drawing Sheets

(56) References Cited

U.S. PATENT DOCUMENTS

| | | | |
|---|---|---|---|
| 9,753,284 B2 | 9/2017 | Machida et al. | |
| 2003/0142086 A1* | 7/2003 | Watanabe | G02B 27/017 345/204 |
| 2008/0291140 A1* | 11/2008 | Kent | G03B 21/567 345/83 |
| 2010/0128107 A1 | 5/2010 | Tomita | |
| 2011/0199582 A1* | 8/2011 | Kuriki | A61B 3/1225 353/31 |
| 2011/0241975 A1 | 10/2011 | Mukawa et al. | |
| 2011/0248905 A1 | 10/2011 | Chosokabe et al. | |
| 2012/0044571 A1 | 2/2012 | Mukawa | |
| 2012/0127434 A1 | 5/2012 | Sasazaki et al. | |
| 2012/0218426 A1 | 8/2012 | Kaizu et al. | |
| 2013/0108229 A1* | 5/2013 | Starner | G02B 27/01 385/119 |
| 2013/0128611 A1* | 5/2013 | Akutsu | G02B 5/09 362/607 |
| 2013/0135749 A1 | 5/2013 | Akutsu et al. | |
| 2013/0182224 A1* | 7/2013 | Schwiegerling | A61B 3/1015 351/234 |
| 2013/0242555 A1 | 9/2013 | Mukawa | |
| 2013/0300766 A1 | 11/2013 | Mukawa | |
| 2014/0022284 A1 | 1/2014 | Chosokabe et al. | |
| 2014/0334010 A1 | 11/2014 | Mukawa | |
| 2014/0340286 A1 | 11/2014 | Machida et al. | |
| 2014/0340550 A1 | 11/2014 | Kaizu et al. | |
| 2015/0062699 A1 | 3/2015 | Hayashi | |
| 2015/0109679 A1 | 4/2015 | Mukawa et al. | |
| 2015/0138647 A1 | 5/2015 | Akutsu et al. | |
| 2015/0177517 A1* | 6/2015 | Blonde | G02B 27/017 345/7 |
| 2015/0229897 A1 | 8/2015 | Mukawa | |
| 2015/0235620 A1 | 8/2015 | Takahota et al. | |
| 2015/0260995 A1 | 9/2015 | Mukawa | |
| 2015/0277125 A1 | 10/2015 | Hirano et al. | |
| 2015/0277126 A1 | 10/2015 | Hirano et al. | |
| 2015/0288954 A1 | 10/2015 | Sasazaki et al. | |
| 2015/0338660 A1 | 11/2015 | Mukawa | |
| 2015/0346494 A1 | 12/2015 | Tanaka et al. | |
| 2015/0362735 A1 | 12/2015 | Akutsu et al. | |
| 2015/0370075 A1 | 12/2015 | Ato et al. | |
| 2016/0041394 A1 | 2/2016 | Tanaka et al. | |
| 2016/0062123 A1 | 3/2016 | Tanaka et al. | |
| 2016/0097931 A1 | 4/2016 | Takahota et al. | |
| 2016/0147069 A1 | 5/2016 | Tanaka et al. | |
| 2016/0154243 A1 | 6/2016 | Aiki | |
| 2017/0069140 A1 | 3/2017 | Mukawa | |
| 2017/0184857 A1 | 6/2017 | Ato et al. | |

OTHER PUBLICATIONS

U.S. Appl. No. 14/581,037, filed Dec. 23, 2014, Mukawa et al.
U.S. Appl. No. 13/207,673, filed Aug. 11, 2011, Mukawa.
U.S. Appl. No. 14/337,620, filed Jul. 22, 2014, Mukawa.
U.S. Appl. No. 13/677,410, filed Nov. 15, 2012, Akutsu et al.
U.S. Appl. No. 14/797,663, filed Jul. 13, 2015, Akutsu et al.
U.S. Appl. No. 13/678,604, filed Nov. 16, 2012, Akutsu et al.
U.S. Appl. No. 14/604,122, filed Jan. 23, 2015, Akutsu et al.
U.S. Appl. No. 13/779,008, filed Feb. 27, 2013, Mukawa.
U.S. Appl. No. 13/875,593, filed May 2, 2013, Mukawa.
U.S. Appl. No. 14/370,362, filed Jul. 2, 2014, Machida et al.
U.S. Appl. No. 14/758,818, filed Jul. 1, 2015, Mukawa.
U.S. Appl. No. 14/612,710, filed Feb. 3, 2015, Mukawa.
U.S. Appl. No. 14/640,437, filed Mar. 6, 2015, Mukawa.
U.S. Appl. No. 14/659,784, filed Mar. 17, 2015, Hirano et al.
U.S. Appl. No. 14/659,943, filed Mar. 17, 2015, Hirano et al.
U.S. Appl. No. 14/422,103, filed Feb. 17, 2015, Takahota et al.
U.S. Appl. No. 12/624,576, filed Nov. 24, 2009, Tomita.
U.S. Appl. No. 13/399,222, filed Feb. 17, 2012, Kaizu et al.
U.S. Appl. No. 14/326,963, filed Jul. 9, 2014, Kaizu et al.
U.S. Appl. No. 14/655,243, filed Jun. 24, 2015, Tanaka et al.
U.S. Appl. No. 14/762,615, filed Jul. 22, 2015, Ato et al.
U.S. Appl. No. 14/781,972, filed Oct. 2, 2015, Tanaka et al.
U.S. Appl. No. 14/782,054, filed Oct. 2, 2015, Tanaka et al.
U.S. Appl. No. 14/889,502, filed Nov. 6, 2015, Takahota et al.
U.S. Appl. No. 14/903,639, filed Jan. 8, 2016, Tanaka et al.
U.S. Appl. No. 13/078,153, filed Apr. 1, 2011, Chosokabe et al.
U.S. Appl. No. 13/295,607, filed Nov. 14, 2011, Sasazaki et al.
U.S. Appl. No. 14/031,740, filed Sep. 19, 2013, Chosokabe et al.
U.S. Appl. No. 14/457,836, filed Aug. 12, 2014, Hayashi.
U.S. Appl. No. 14/680,632, filed Apr. 7, 2015, Sasazaki et al.
U.S. Appl. No. 14/901,192, filed Dec. 28, 2015, Aiki.
U.S. Appl. No. 15/353,110, filed Nov. 16, 2016, Mukawa.
U.S. Appl. No. 15/388,544, filed Dec. 22, 2016, Miyawaki et al.
U.S. Appl. No. 15/454,472, filed Mar. 9, 2017, Ato et al.
U.S. Appl. No. 15/658,601, filed Jul. 25, 2017, Machida et al.

* cited by examiner

HEAD MOUNTED IMAGE DISPLAY DEVICE AND DISPLAY DEVICE

CROSS REFERENCE TO RELATED APPLICATIONS

This application claims the benefit of Japanese Priority Patent Application JP 2014-023137 filed Feb. 10, 2014, the entire contents of which are incorporated herein by reference.

BACKGROUND

The present disclosure relates to an image display device and a display device including a relevant image display device, and more particularly, to a display device used as a head mounted display (HMD) and an image display device used in a relevant display device.

A virtual display device (image display device) for allowing an observer to observe a two-dimensional (2D) image formed by an image forming device as a virtual image enlarged by a virtual image optical system is well known, for example, from Japanese Patent Application Publication No. 2006-162767.

As illustrated in a conceptual diagram of FIG. 22, an image display device 100' includes an image forming device 111 having a plurality of pixels arranged in a 2D matrix, a collimating optical system 112, which collimates light output from a pixel of the image forming device 111 into parallel light, and an optical device (a light guide device) 120 on which the parallel light from the collimating optical system 112 is incident, through which the light is guided, and from which the light is output. The optical device 120 includes a light guide plate 121, which outputs the incident light after the incident light propagates through the inside according to total reflection, a first polarizing unit 130 (for example, including a light reflecting film of one layer), which reflects the light incident on the light guide plate 121 so that the light incident on the light guide plate 121 is totally reflected inside the light guide plate 121, and a second polarizing unit 140 (for example, including a light reflecting multi-film having a multi-layer laminated structure), which outputs from the light guide plate 121 the light propagating through the inside of the light guide plate 121 according to the total reflection. A weight and size of a device can be reduced, for example, when the HMD is formed according to such an image display device 100'. Here, reference numerals representing the other components in FIG. 22 can be found with reference to an image display device according to Embodiment 1 which will be described with reference to FIG. 1.

Alternatively, in order to allow an observer to observe a 2D image formed by the image forming device as a virtual image enlarged by the virtual image optical system, a virtual image display device (image display device) using hologram diffraction gratings is well known, for example, from Japanese Patent Application Publication No. 2007-094175.

As illustrated in a conceptual diagram of FIG. 23, an image display device 300' basically includes an image forming device 111, which displays an image, a collimating optical system 112, and an optical device (a light guide device) 320 on which light displayed on the image forming device 111 is incident and through which the incident light is guided to a pupil 21 of the observer. Here, the optical device 320 includes a light guide plate 321 and a first diffraction grating member 330 and a second diffraction grating member 340 formed by reflective volume hologram diffraction gratings provided on the light guide plate 321. Light output from each pixel of the image forming device 111 is incident on the collimating optical system 112, and a plurality beams of parallel light having different angles at which the parallel light is incident on the light guide plate 321 is generated by the collimating optical system 112, and incident on the light guide plate 321. The parallel light is incident on and output from a first surface 322 of the light guide plate 321. On the other hand, the first diffraction grating member 330 and the second diffraction grating member 340 are mounted on a second surface 323 of the light guide plate 321 parallel to the first surface 322 of the light guide plate 321. Here, reference numerals representing the other components of FIG. 23 can be found with reference to an image display device according to Embodiment 4 which will be described with reference to FIG. 7.

SUMMARY

Meanwhile, in the image display device, for example, if the light guide plate gets dirty or the light source constituting the image forming device is temporally degraded, light intensity of an image reaching the observer is reduced, and, for example, if deviation or the like occurs in the optical system of the image display device, the light intensity of an image reaching the observer is reduced, or an image quality of the image observed by the observer is reduced. Further, depending on the light source equipped in the image forming device, a wavelength of light output from the light source changes due to heat generation of the light source, and an image quality of an image observed by an observer may be consequently lowered. However, in the head mounted display of the related art, it is difficult to detect the occurrence of an abnormality in the image display device or to detect a variation in a wavelength of light output from the light source.

Thus, it is desirable to provide an image display device having a configuration and structure capable of easily detecting the occurrence of an abnormality in the image display device and a display device including a relevant image display device. It is also desirable to provide an image display device having a configuration and structure capable of easily detecting a variation in a wavelength of light output from the light source and a display device including a relevant image display device.

According to an embodiment of the present disclosure, there is provided an image display device including (A) an image forming device, (B) an optical device configured to receive incident light output from the image forming device and output the incident light, and (C) a light receiving device configured to detect the light output from the image forming device.

According to another embodiment of the present disclosure, there is provided a display device including (I) a frame to be mounted on a head of an observer, and (II) an image display device mounted on the frame, the image display device including (A) an image forming device, (B) an optical device configured to receive incident light output from the image forming device and outputs the incident light, and (C) a light receiving device configured to detect the light output from the image forming device. That is to say, the image display device in the display device according to an embodiment of the present disclosure includes the image display device according to an embodiment of the present disclosure.

According to still another embodiment of the present disclosure, there is provided an image display device including (A) an image forming device configured to include a liquid crystal display device and a light source, (B) a light guide plate configured to propagate light output from the image forming device, and (C) a light receiving device configured to detect part of light output from the image forming device. A wavelength of light output from the light source is controlled based on a detection result of the light receiving device.

According to one or more of embodiments of the present disclosure, the image display device or the display device of an embodiment of the present disclosure is provided with a light receiving device that detects light output from an image forming device, and thus it is possible to immediately detect whether or not an image to be displayed on an image display device or light output from an optical device is abnormal with a high degree of accuracy. Here, the effects described in this specification are merely exemplary and not limited, and there may be additional effects.

DETAILED DESCRIPTION OF THE EMBODIMENT(S)

Figure 1:
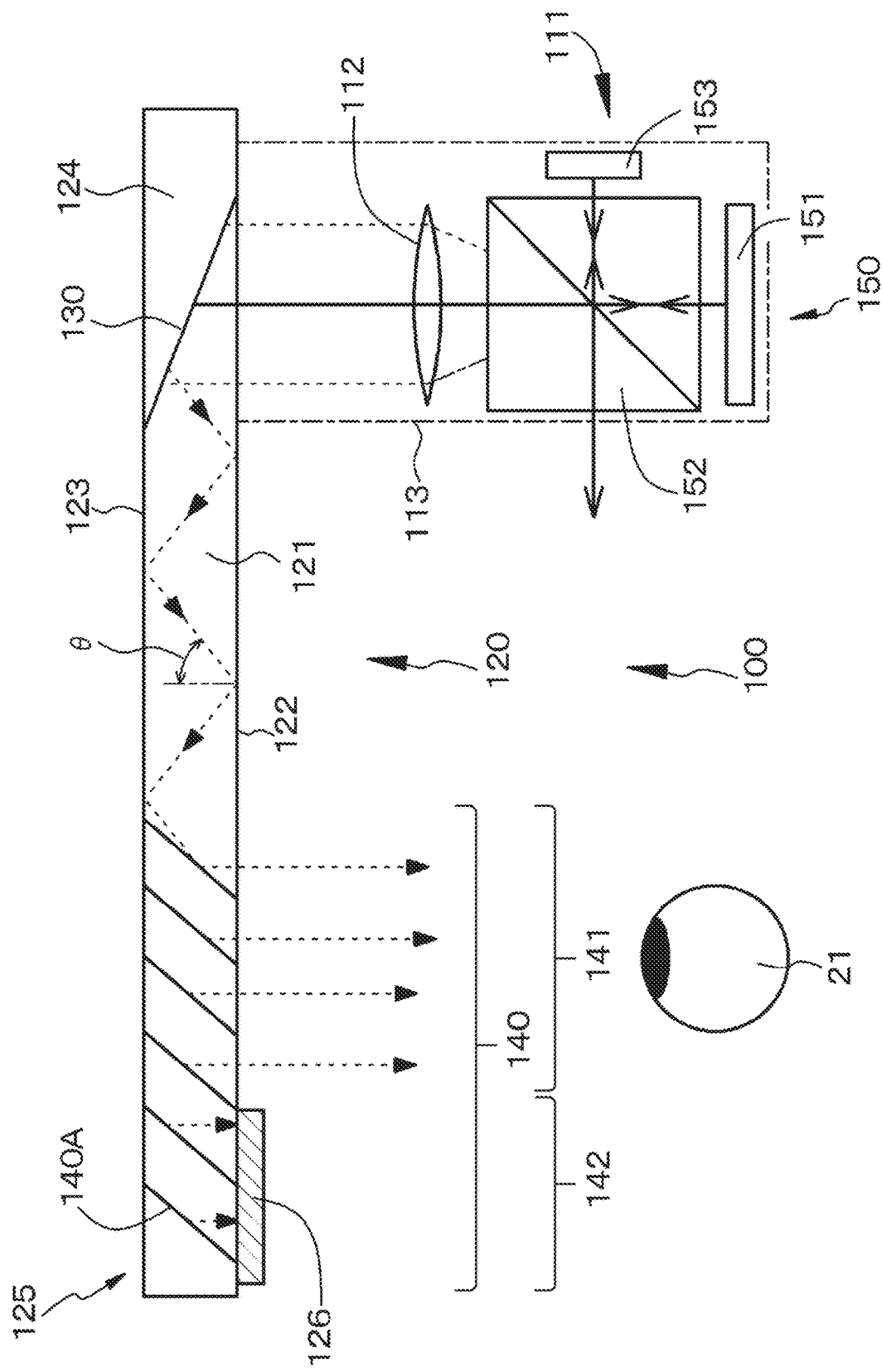
FIG. 1 is a conceptual diagram of an image display device in a display device of Embodiment 1.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present disclosure will be described with reference to the appended drawings, but the present disclosure is not limited to the following embodiments, and various numerical values or materials in the following embodiments are exemplary. The description will proceed in the following order.

1. Overall description of display device and image display device of present disclosure 2. Embodiment 1 (display device and image display device: first and third forms of image display devices of present disclosure)

3. Embodiment 2 (modification of Embodiment 1: fourth and sixth forms of image display devices)

4. Embodiment 3 (modifications of Embodiment 1 and Embodiment 2)

5. Embodiment 4 (other modifications of Embodiment 1 and Embodiment 2)

6. Embodiment 5 (modification of Embodiment 4)

7. Embodiment 6 (modifications of Embodiment 1 and Embodiments 3 to 5: second and third forms of image display devices)

8. Embodiment 7 (modification of Embodiment 6: fifth and sixth forms of image display devices)

9. Embodiment 8 (modifications of Embodiment 1 and Embodiments 3 to 5: third form of image display device)

10. Embodiment 9 (modification of Embodiment 8: sixth form of image display device)

11. Embodiment 10 (modifications of Embodiments 1 to 9: third and sixth forms of image display devices)

12. Embodiment 11 (other modifications of Embodiments 1 to 9) and others

[Overall Description of Display Device and Image Display Device of Present Disclosure]

In the image display device or the image display device in the display device (which will be generically referred to be "image display device according to an embodiment of the present disclosure or the like") according to an embodiment of the present disclosure, the optical device can include (a) a light guide plate configured to cause the incident light to propagate inside the light guide plate according to total reflection and then output the incident light, (b) a first polarizing unit configured to polarize the light incident on the light guide plate so that the light incident on the light guide plate is totally reflected inside the light guide plate, and (c) a second polarizing unit configured to polarize the light propagating inside the light guide plate according to total reflection to output part of light propagating inside the light guide plate according to total reflection from the light guide plate, the second polarizing unit including a first portion that polarizes the light propagating inside the light guide plate according to total reflection toward an observer, and a second portion that polarizes the light propagating inside the light guide plate according to total reflection toward the light receiving device. For convenience, this image display device is referred to as the "first form of image display device." The term "total reflection" means internal total reflection or total reflection inside the light guide plate. Hereinafter, the same is also true.

Alternatively, in the image display device according to an embodiment of the present disclosure or the like, the optical device can include (a) a light guide plate configured to cause the incident light to propagate inside the light guide plate according to total reflection and then output the incident light, (b) a first polarizing unit configured to polarize the light incident on the light guide plate so that the light incident on the light guide plate is totally reflected inside the light guide plate, and (c) a second polarizing unit configured to polarize the light propagating inside the light guide plate according to total reflection to output part of light propagating inside the light guide plate according to total reflection from the light guide plate. The light receiving device can be arranged on an end portion of the light guide plate at a side of the second polarizing unit. For convenience, this image display device is referred to as the "second form of image display device."

In the first and second forms of image display devices and fourth and fifth forms of image display devices to be described later, the first polarizing unit may be configured to reflect all light incident on the light guide plate or reflect part of light incident on the light guide plate, and the second polarizing unit may be configured to transmit and reflect light propagating inside the light guide plate according to total reflection. In other words, in this case, the first polarizing unit functions as a reflecting mirror or a semi-transmissive mirror, and the second polarizing unit functions as a semi-transmissive mirror. Here, the second polarizing unit may be configured with a reflective volume hologram diffraction grating. Here, according to circumstances, in the first form of image display device and the fourth form of image display device to be described later, the second polarizing unit may be configured to output all light propagating inside the light guide plate according to total reflection from the light guide plate.

Alternatively, in the image display device according to an embodiment of the present disclosure or the like, the optical device can include a light semi-reflecting member that reflects part of light output from the image forming device and transmits a remaining part. The light receiving device can detect the light passing through the light semi-reflecting member. For convenience, this image display device is referred to as the "third form of image display device."

In the third form of image display device and the sixth form of image display device to be described later, the light semi-reflecting member may be configured with the first polarizing unit or may be configured with the second polarizing unit.

Alternatively, in the third form of image display device and the sixth form of image display device to be described later, the light semi-reflecting member may be configured with a concave mirror that reflects light from the image forming device. In this case, the optical device preferably includes a semi-transmissive mirror that outputs light reflected by the concave mirror toward the observer and a quarter wavelength plate arranged between the semi-transmissive mirror and the concave mirror. Preferably, the concave mirror is configured to transmit part of light incident on the concave mirror (that is, the concave mirror is configured with a semi-transmissive concave mirror), and the light receiving device is arranged to receive light passing through the concave mirror.

Alternatively, in the image display device of an embodiment of the present disclosure or the like, the light receiving device may employ a form in which the light receiving device is optically connected to the optical device. In other words, not only a form in which the light receiving device is connected to the optical device directly but also a form in which the light receiving device is connected to the optical device through an adhesive member, a light guide member, or the like so that light is input is also included.

Further, in the image display device of an embodiment of the present disclosure or the like having various kinds of preferred forms and configurations, a configuration in which an operation of the image forming device is controlled based on the detection result of the light receiving device may be provided. In this case, a configuration in which a position of an image output from the image forming device is controlled based on the detection result of the light receiving device or a configuration in which an output angle of light output from the optical device is controlled based on the detection result of the light receiving device may be provided. Alternatively, in order to compensate for distortion occurring in an image output from the optical device, a configuration in which a signal for compensating for distortion occurring in an image is weighted to an image signal to be transmitted to the image forming device, that is, a configuration in which a signal for compensating for distortion occurring in an image output from the optical device is transmitted to the image forming device based on the detection result of the light receiving device, may be provided.

Alternatively, in the image display device according to an embodiment of the present disclosure or the like, the image forming device can include a light source configured with a GaN semiconductor laser element. The optical device can include (a) a light guide plate configured to cause the incident light to propagate inside the light guide plate according to total reflection and then output the incident light, (b) a first polarizing unit configured to polarize the light incident on the light guide plate so that the light incident on the light guide plate is totally reflected inside the light guide plate, the first polarizing unit being configured with a reflecting mirror or a semi-transmissive mirror, and (c) a second polarizing unit configured to polarize the light propagating inside the light guide plate according to total reflection to output part of light propagating inside the light guide plate according to total reflection from the light guide plate, the second polarizing unit being configured with a reflective volume hologram diffraction grating, the second polarizing unit including a first portion that polarizes the light propagating inside the light guide plate according to total reflection toward an observer, and a second portion that polarizes the light propagating inside the light guide plate according to total reflection toward the light receiving device. A wavelength of light output from the light source is controlled based on a detection result of the light receiving device.

Alternatively, in the image display device according to an embodiment of the present disclosure or the like, the image forming device can include a light source configured with a GaN semiconductor laser element. The optical device can include (a) a light guide plate configured to cause the incident light to propagate inside the light guide plate according to total reflection and then output the incident light, (b) a first polarizing unit configured to polarize the light incident on the light guide plate so that the light incident on the light guide plate is totally reflected inside the light guide plate, the first polarizing unit being configured with a reflecting mirror or a semi-transmissive mirror, and (c) a second polarizing unit configured to polarize the light propagating inside the light guide plate according to total reflection to output part of light propagating inside the light guide plate according to total reflection from the light guide plate, the second polarizing unit being configured with a reflective volume hologram diffraction grating. The light receiving device can be arranged on an end portion of the light guide plate at a side of the second polarizing unit. A wavelength of light output from the light source can be controlled based on a detection result of the light receiving device.

Alternatively, in the image display device according to an embodiment of the present disclosure or the like, the image forming device can include a light source configured with a GaN semiconductor laser element. The optical device can include a light semi-reflecting member that reflects part of light output from the image forming device and transmits a remaining part. The light receiving device can detect the light passing through the light semi-reflecting member, and controls a wavelength of light output from the light source based on a detection result. For convenience, this image display device is referred to as the "sixth form of image display device."

Further, in the image display device of an embodiment of the present disclosure or the like having various kinds of preferred forms and configurations, the light receiving device may have a configuration in which the light receiving elements are arranged one-dimensionally (that is, configured with a so-called line sensor) or a configuration in which the light receiving elements are arranged in a 2D matrix (that is, configured with a so-called imaging element). Here, the line sensor or the imaging element may be configured with a solid-state imaging device including a collection of photo sensors or a CCD or CMOS sensor.

In order to detect the occurrence of an abnormality in the image display device, preferably, a test signal is transmitted to the image forming device during one image display frame at intervals of a certain period of time (for example, at intervals of 10 seconds or 1 minute), a test pattern is displayed on the image forming device, and the relevant test pattern is detected by the light receiving device. Alternatively, preferably, when an operation of the image display device starts or ends, the test signal is transmitted to the image forming device, the test pattern is displayed on the image forming device, and the relevant test pattern is detected by the light receiving device. When the image display device is operating normally, the test pattern is received in a certain pixel of the light receiving device. However, when an abnormality occurs in the image display device, the test pattern is received in a pixel deviated from the certain pixel of the light receiving device. Alternatively, when an abnormality occurs in the image display device, there are also cases in which intensity of light received by the light receiving device is reduced. Thus, when the light receiving device detects that an abnormality has occurred in the image display device, the image display device or the display device outputs a warning. Alternatively, when the test pattern is received in the pixel deviated from the certain pixel of the light receiving device, it is preferable to compensate an image signal to be transmitted to the image forming device and eliminate the deviation. Alternatively, an output angle of light output from the optical device may be controlled, and in order to compensate for distortion occurring in an image output from the optical device, a configuration in which a signal for compensating for distortion occurring in an image is weighted to an image signal to be transmitted to the image forming device may be provided. Further, when intensity of light received by the light receiving device is reduced, it is preferable to perform processing (for example, an increase in light intensity of the light source) of increasing light intensity of an image formed by the image forming device.

In the fourth to sixth forms of image display devices, in order to detect whether or not a wavelength of light output from the light source has significantly changed, preferably, the test signal is transmitted to the image forming device during one image display frame at intervals of a certain period of time (for example, at intervals of 10 seconds or 1 minute), the test pattern is displayed on the image forming device, and the relevant test pattern is detected by the light receiving device. When the wavelength of light output from the light source has not significantly changed, the test pattern is received in the certain pixel of the light receiving device. However, when the wavelength of light output from the light source has significantly changed, specifically, when the wavelength of light output from the light source has increased due to heat generation of the light source, the test pattern is received in the pixel deviated from the certain pixel of the light receiving device. Alternatively, there are also cases in which intensity of light received by the light receiving device is reduced. Thus, when such a phenomenon is detected by the light receiving device, it is preferable that the wavelength of light output from the light source be shifted to the short wavelength side to return to the original wavelength by increasing a driving current of a GaN semiconductor laser element constituting the light source. Here, when the GaN semiconductor laser element is driven based on a pulse width modulation (PWM) scheme, it is preferable to control a pulse height.

In the display device of an embodiment of the present disclosure having various kinds of preferred forms and configurations, the optical device may be of a transmissive type or a semi-transmissive type (see-through type). Specifically, at least a portion of the optical device facing an observer's pupil is configured to be transmissive or semi-transmissive (see-through), and it is possible to view an outside view through the portion of the optical device. The display device may include one image display device or two image display devices.

In this specification, the terms "semi-transmissive" and "semi-reflective" may indicate not only that ½ (50%) of incident light is transmitted or reflected, but also that part of incident light is transmitted and the remaining part is reflected.

When the first polarizing unit reflects all light incident on the light guide plate, for example, the first polarizing unit may be configured with a light reflecting film (a type of mirror) that is formed of a metal including an alloy and reflects light incident on the light guide plate. Further, when the first polarizing unit reflects part of light incident on the light guide plate, for example, the first polarizing unit may be configured with a multi-layer laminated structure in which a plurality of dielectric laminated films are laminated, a half mirror, or a polarization beam splitter. Furthermore, the second polarizing unit may be configured with a multi-layer laminated structure in which a plurality of dielectric laminated films are laminated, a half mirror, a polarization beam splitter, or a hologram diffraction grating film. The first polarizing unit and the second polarizing unit are disposed in the light guide plate, but in the first polarizing unit, at least part of parallel light incident on the light guide plate is reflected or diffracted so that the parallel light incident on the light guide plate is totally reflected inside the light guide plate. Meanwhile, in the second polarizing unit, parallel light propagating inside the light guide plate according to total reflection is refracted or diffracted a plurality of times and then output from the light guide plate in a parallel light state.

Alternatively, the first polarizing unit can be configured to diffract light incident on the light guide plate, and the second polarizing unit can be configured to diffract light propagating through the inside of the light guide plate according to the total reflection. In this case, the first polarizing unit and the second polarizing unit can be formed by diffraction grating elements. Further, the diffraction grating element can be formed by a reflective diffraction grating element or a transmissive diffraction grating element. Alternatively, one diffraction grating element can be formed by the reflective diffraction grating element and the other diffraction grating element can be formed by the transmissive diffraction grating element. A reflective volume hologram diffraction grating can be included as the reflective diffraction grating element. For convenience, the first polarizing unit formed by the reflective volume hologram diffraction grating may be referred to as a "first diffraction grating member," and the second polarizing unit formed by the reflective volume hologram diffraction grating may be referred to as a "second diffraction grating member."

The image display device in accordance with the present disclosure can perform a single-color (for example, green) image display. When color image display is performed, P diffraction grating layers, each of which is formed by a reflective volume hologram diffraction grating, can be laminated to cause the first diffraction grating member or the second diffraction grating member to cope with diffraction/reflection of P types of light having P types (for example, P=3, that is, three types of red, green, and blue) of different wavelength bands (or wavelengths). Each diffraction grating layer is provided with interference fringes corresponding to one type of wavelength band (or wavelength). Alternatively, to cope with diffraction and reflection of P types of light having P types of different wavelength bands (or wavelengths), P types of interference fringes can be configured to be formed in the first diffraction grating member or the second diffraction grating member formed by one diffraction grating layer. Alternatively, for example, the angle of view can be divided into three equal parts, and the first diffraction grating member or the second diffraction grating member can be configured by laminating diffraction grating layers corresponding to angles of view. Alternatively, for example, a structure in which a first diffraction grating member and a second diffraction grating member, each of which is configured with a diffraction grating layer formed of a reflective volume hologram diffraction grating that diffracts or reflects light having a red wavelength band (or wavelength), are arranged in the first light guide plate, a first diffraction grating member and a second diffraction grating member, each of which is configured with a diffraction grating layer formed of a reflective volume hologram diffraction grating that that diffracts or reflects light having a green wavelength band (or wavelength), are arranged in the second light guide plate, a first diffraction grating member and a second diffraction grating member, each of which is configured with a diffraction grating layer formed of a reflective volume hologram diffraction grating that that diffracts or reflects light having a blue wavelength band (or wavelength), are arranged in the third light guide plate, and the first light guide plate, the second light guide plate, and the third light guide plate are laminated with a gap therebetween may be adopted. By adopting these configurations, it is possible to increase the diffraction efficiency and acceptable diffraction angle and optimize the diffraction angle when light beams having the wavelength bands (or wavelengths) are diffracted and reflected by the first diffraction grating member or the second diffraction grating member. A protection member is preferably arranged so that the reflective volume hologram diffraction gratings do not come in direct contact with the air.

The first diffraction grating member and the second diffraction grating member can be formed of a photopolymer material. It is only necessary that the material and basic structure of the first diffraction grating member and the second diffraction grating member formed by the reflective volume hologram diffraction gratings be the same as those of the reflective volume hologram diffraction gratings of the related art. The reflective volume hologram diffraction grating refers to a hologram diffraction grating that diffracts and reflects only +1-order diffracted light. Although the diffraction grating member is provided with interference fringes extending from the inner side to the outer side of the diffraction grating member, a method of forming the interference fringes may be the same as adopted in the related art. Specifically, for example, it is only necessary that a material (e.g., a photopolymer material) constituting the diffraction grating member be irradiated with object light in a first predetermined direction on one side, a material constituting the diffraction grating member be simultaneously irradiated with reference light in a second predetermined direction on the other side, and interference fringes formed by the object light and the reference light be recorded in the material constituting the diffraction grating member. By appropriately selecting the first predetermined direction, the second predetermined direction, and wavelengths of the object light and the reference light, a desired pitch of the interference fringes and a desired slant angle of the interference fringes on the surfaces of the diffraction grating member can be obtained. The slant angle of the interference fringes refers to the angle formed between the surfaces of the diffraction grating member (or the diffraction grating layer) and the interference fringes. When the first diffraction grating member and the second diffraction grating member are formed by a laminated structure in which P diffraction grating layers, each of which is formed by a reflective volume hologram diffraction grating, are laminated, it is only necessary to separately manufacture P diffraction grating layers and then laminate (adhere) the P diffraction grating layers, for example, using an ultraviolet curing resin adhesive. In addition, the P diffraction grating layers may be formed by manufacturing one diffraction grating layer using an adhesive photopolymer material, and then adhering layers of the adhesive photopolymer material thereon in order to manufacture diffraction grating layers.

Alternatively, in the image display device in accordance with the present disclosure, the optical device can be formed by a semi-transmissive mirror on which light output from the image forming device is incident and from which the incident light is reflected and output toward the pupil of the observer. A structure in which the light output from the image forming device propagates through the air and is incident on the semi-transmissive mirror may be provided. For example, a structure in which the light output from the image forming device propagates inside a transparent member such as a glass plate or a plastic plate (specifically, a member formed of the same material as the material constituting the light guide plate to be described later) and incident on a semi-transmissive mirror may be provided. The semi-transmissive mirror may be mounted on the image forming device via the transparent member, and the semi-transmissive mirror may be mounted on the image forming device via a member separate from the transparent member.

In the image display device of an embodiment of the present disclosure or the like having various kinds of preferred forms and configurations, the image forming device may be configured to include a plurality of pixels arranged in a 2D matrix. Here, a configuration of this image forming device is referred to as a "first form of image forming device" for convenience.

As the first form of image forming device, for example, there are an image forming device configured with a reflective spatial light modulating device and a light source, an image forming device configured with a transmissive spatial light modulating device and a light source, and an image forming device configured with a light emitting element such as an organic electro luminescence (EL), an inorganic EL, or a light emitting diode (LED), but among the image forming devices, the image forming device configured with the reflective spatial light modulating device and the light source is preferable. As the spatial light modulating device, a light valve, a transmissive or reflective LCD device such as a liquid crystal on silicon (LCOS), or a digital micro mirror device (DMD) may be used, and a light emitting element may be used as a light source. Further, the reflective spatial light modulating device may be configured with an LCD device and a polarization beam splitter that reflects part of light from the light source to be guided to the LCD device and transmits part of light reflected by the LCD device to be guided to an optical system. As the light emitting elements constituting the light source, the red light emitting element, the green light emitting element, the blue light emitting element, and the white light emitting element may be used, or white light may be obtained by mixing red, green, and blue light output from the red light emitting element, the green light emitting element, and the blue light emitting element using the light pipe and performing luminance equalization. As the light emitting element, for example, there are examples of a semiconductor laser element, a solid-state laser, and an LED. The number of pixels may be determined based on specifications necessary for the image display device, and as a specific value of the number of pixels, there are examples of 320×240, 432×240, 640×480, 854×480, 1024×768, and 1920×1080. Here, in the fourth to sixth forms of image display devices, the light emitting element may be configured with the GaN semiconductor laser element as described above.

Alternatively, in the image display device of an embodiment of the present disclosure having the preferred forms and configurations described above, the image forming device may be configured to include a light source and a scanning unit that scans parallel light output from the light source. Here, a configuration of this image forming device is referred to as a "second form of image forming device" for convenience.

A light emitting element can be included as a light source in the second form of image forming device, and specifically include a red light emitting element, a green light emitting element, a blue light emitting element, and a white light emitting element. Alternatively, white light may be obtained by mixing red, green, and blue light beams output from the red light emitting element, the green light emitting element, and the blue light emitting element using the light pipe and performing luminance equalization. As the light emitting element, for example, there are examples of a semiconductor laser element, a solid-state laser, and an LED. In the second form of image forming device, the number of pixels (virtual pixels) may be determined based on specifications necessary for the image display device. As a specific value of the number of pixels (virtual pixels), there are examples of 320×240, 432×240, 640×480, 854×480, 1024×768, and 1920×1080. In addition, in the case of a color display, when the light source includes the red light emitting element, the green light emitting element, and the blue light emitting element, it is preferable to perform color synthesis, for example, using a cross prism. As the scanning unit, for example, a micro electro mechanical system (MEMS), which has a micro mirror rotatable in a 2D direction to horizontally and vertically scan light output from the light source, or a galvano mirror can be included. It is only necessary to form the relay optical system constituting the parallel light outputting optical system by a well-known relay optical system. Here, in the fourth to sixth forms of image display devices, the light emitting element may be configured with the GaN semiconductor laser element as described above.

In the first form of image forming device or the second form of image forming device, light converted into a plurality of beams of parallel light is incident on the light guide plate through the optical system (that is an optical system that outputs parallel light, which is also called a "parallel light outputting optical system," and specifically, for example, a collimating optical system or a relay optical system), but the parallel light is necessary because it is necessary to store optical wavefront information when the light is incident on the light guide plate even after the optical wavefront information is output from the light guide plate through the first polarizing unit and the second polarizing unit. Here, in order to generate a plurality of beams of parallel light, specifically, for example, it is preferable that a light output portion of an image forming device be positioned at a place (a position) of a focal distance of the parallel light outputting optical system. The parallel light outputting optical system has a function of converting position information of a pixel into angle information in the optical system of the optical device. As the parallel light outputting optical system, there is an example of an optical system having positive optical power as a whole in which a convex lens, a concave lens, a free-form surface prism, or a hologram lens is independently arranged or the lenses are combined. A light shielding portion having an opening portion may be arranged between the parallel light outputting optical system and the light guide plate in order to prevent undesired light from being output from the parallel light outputting optical system and incident on the light guide plate.

For example, the light guide plate can be formed of a glass material including optical glass such as quartz glass or BK7, or a plastic material (e.g., poly methyl methacrylate (PMMA), a polycarbonate resin, an acrylic resin, amorphous polypropylene resin, or a styrene resin including acrylonitrile styrene (AS) resin). The shape of the light guide plate is not limited to a flat plate, but may be curved. As a material for forming the light guide plate, a glass including optical glass such as quartz glass or BK7, or a plastic material (e.g., PMMA, a polycarbonate resin, an acrylic resin, an amorphous polypropylene resin, or a styrene resin including an acrylonitrile styrene (AS) resin) may be used. The shape of the light guide plate is not limited to a flat plate but may be a curved shape.

In the display device of an embodiment of the present disclosure, a frame may be configured with a front portion arranged in front of the observer and two temple portions rotatably mounted on both ends of the front portion via a hinge. Here, an ear bend portion is mounted on a tip end portion of each temple portion. The image display device is mounted on the frame, and specifically, for example, the image forming device is preferably mounted on the temple portion. Further, a configuration in which the front portion and the two temple portions are integrated may be provided. In other words, in view of the entire display device of an embodiment of the present disclosure, the frame has substantially the same structure as normal glasses. A material for forming the frame including a pad portion may be the same material as a material for forming normal glasses such as a metal, an alloy, a plastic, or a combination thereof. Further, a configuration in which a nose pad is mounted on the front portion may be provided. In other words, in view of the entire display device of an embodiment of the present disclosure, an assembly of the frame and the nose pad has substantially the same structure as normal glasses except that there is no rim. The nose pad may also have a known configuration and structure.

From the viewpoint of design or ease of wearing, it is preferable that wirings (signal lines, power lines, or the like) from one or two image forming devices be formed to extend from the tip end portion of the ear bend portion to the outside via the temple portion and the inside of the ear bend portion and to be connected to the control device (a control circuit or a control unit). Further, it is preferable to configure a form in which each image forming device includes a headphone unit, and a wiring for the headphone unit from each image forming device extends from the tip end portion of the ear bend portion to the headphone unit via the temple portion and the inside of the ear bend portion. Examples of the headphone unit are an inner-ear type of headphone unit and a canal type of headphone unit. More specifically, it is preferable to configure a form in which the wiring for the headphone unit from the tip end portion of the ear bend portion wraps around the rear side of the auricle (auditory capsule) and extends to the headphone unit.

In addition, in the HMD, an imaging device can be formed to be mounted on a center portion of the front portion. Specifically, the imaging device is formed by a solid-state imaging device, for example, formed by a CCD or a CMOS sensor and a lens. It is only necessary that a wiring extending from the imaging device be connected to one image display device (or an image forming device), for example, through the front portion and further included in a wiring extending from the image display device (or the image forming device).

Light beams that have been output from the center of the image forming device and have passed through the image forming device side node of the optical system are referred to as "central light beams," and light beams that are vertically incident on the optical device among the central light beams are referred to as "central incident light beams." Further, a point at which the central incident light beams are incident on the optical device is referred to as an optical device central point, an axial line that passes through the optical device central point and is parallel to an axial line direction of the optical device is referred to as an X axis, and an axial line that passes through the optical device central point and matches a normal line of the optical device is referred to as a Y axis. In the display device of an embodiment of the present disclosure, the horizontal direction is a direction parallel to the X axis and is hereinafter also referred to as an "X axis direction." Here, the optical system is arranged between the image forming device and the optical device, and converts light output from the image forming device into parallel light. Further, beams converted into parallel light by the optical system are incident on, guided to, and output to the optical device. A central point of the first polarizing unit is referred to as an "optical device central point."

The display device of an embodiment of the present disclosure having the various modified examples described above can be used, for example, for a display of various kinds of descriptions, symbols, signs, marks, emblems, or designs when an observation target (subject) such as various kinds of devices are driven, operated, maintained, disassembled, or the like, a display of various kinds of descriptions, symbols, signs, marks, emblems, or designs related to an observation target (subject) such as a person or a product, a display of a moving image or a still image, a display of subtitles of a movie or the like, a display of descriptive text or closed captions related to a video synchronized with a video, or a display of various kinds of descriptions related to an observation target (subject) in a drama, kabuki, Noh, a comic drama, an opera, a concert, a ballet, various kinds of plays, an amusement park, an art gallery, a sightseeing area, a resort, a tourist guide, or the like, descriptive text for describing content or a progress state thereof, a background, or the like, etc., and can be used for a display of closed captions. Here, various kinds of content described above correspond to information corresponding to data related to a subject. In a drama, kabuki, Noh, a comic drama, an opera, a concert, a ballet, various kinds of plays, an amusement park, an art gallery, a sightseeing area, a resort, a tourist guide, or the like, it is preferable to display text serving as an image associated with an observation target through the display device at an appropriate timing. Specifically, for example, according to a progress state of a movie or the like or according to a progress state of a drama, based on a certain schedule or an allocation of time, by an operator's operation or under control of a computer or the like, an image control signal is transmitted to the display device, and an image is displayed on the display device. Further, a display of various kinds of descriptions related to an observation target (subject) such as various kinds of devices, people, or products is performed, but by shooting an observation target (subject) such as various kinds of devices, people, or products and analyzing shot content in the display device, it is possible to display various kinds of previously created descriptions related to an observation target (subject) such as various kinds of devices, people, or products through the display device. Alternatively, the display device of an embodiment of the present disclosure can be used as a stereoscopic display device. In this case, it is preferable that a polarizing plate or a polarizing film be removably mounted on the optical device, or a polarizing plate or a polarizing film be attached to the optical device as necessary.

An image signal to be output to the image forming device may include not only an image signal (for example, text data) but also luminance data (luminance information) related to an image to be displayed, chromaticity data (chromaticity information), or luminance data and chromaticity data. As the luminance data, luminance data corresponding to luminance of a certain region including an observation target viewed through the optical device may be used, and as the chromaticity data, chromaticity data corresponding to chromaticity of a certain region including an observation target viewed through the optical device may be used. As described above, it is possible to control luminance (brightness) of an image to be displayed when the luminance data related to the image is included, it is possible to control chromaticity (color) of an image to be displayed when the chromaticity data related to the image is included, and it is possible to control luminance (brightness) and chromaticity (color) of an image to be displayed when the luminance data and the chromaticity data related to the image are included. When luminance data corresponding to luminance of a certain region including an observation target viewed through the image display device is used, it is preferable to set a value of the luminance data so that a value of luminance of an image increases (that is, an image is more brightly displayed) as a value of the luminance of the certain region including the observation target viewed through the image display device increases. Further, when chromaticity data corresponding to chromaticity of a certain region including an observation target viewed through the image display device is used, it is preferable to set a value of the chromaticity data so that the chromaticity of the certain region including the observation target viewed through the image display device and the chromaticity of the image to be displayed roughly have a complementary color relation. A complementary color refers to a combination of colors having an exactly opposite positional relation in a color circle. For example, a color complementary to red is green, a color complementary to yellow is purple, and a color complementary to blue is orange. It also refers to a color that causes saturation to decrease, such as white in case of light or black in case of an object when a certain color is mixed with another color at an appropriate ratio, but complementarity of a visual effect when arranged in parallel is different from complementarity when mixed. It is also referred to as a contrast color and an opposite color. Here, an opposite color refers to a color directly opposite to a complementary color, whereas a range indicated by a complementary color is slightly larger. A color combination of complementary colors creates a synergy effect in which both colors are emphasized, which is referred to as complementary color harmony.

Embodiment 1

Figure 2:
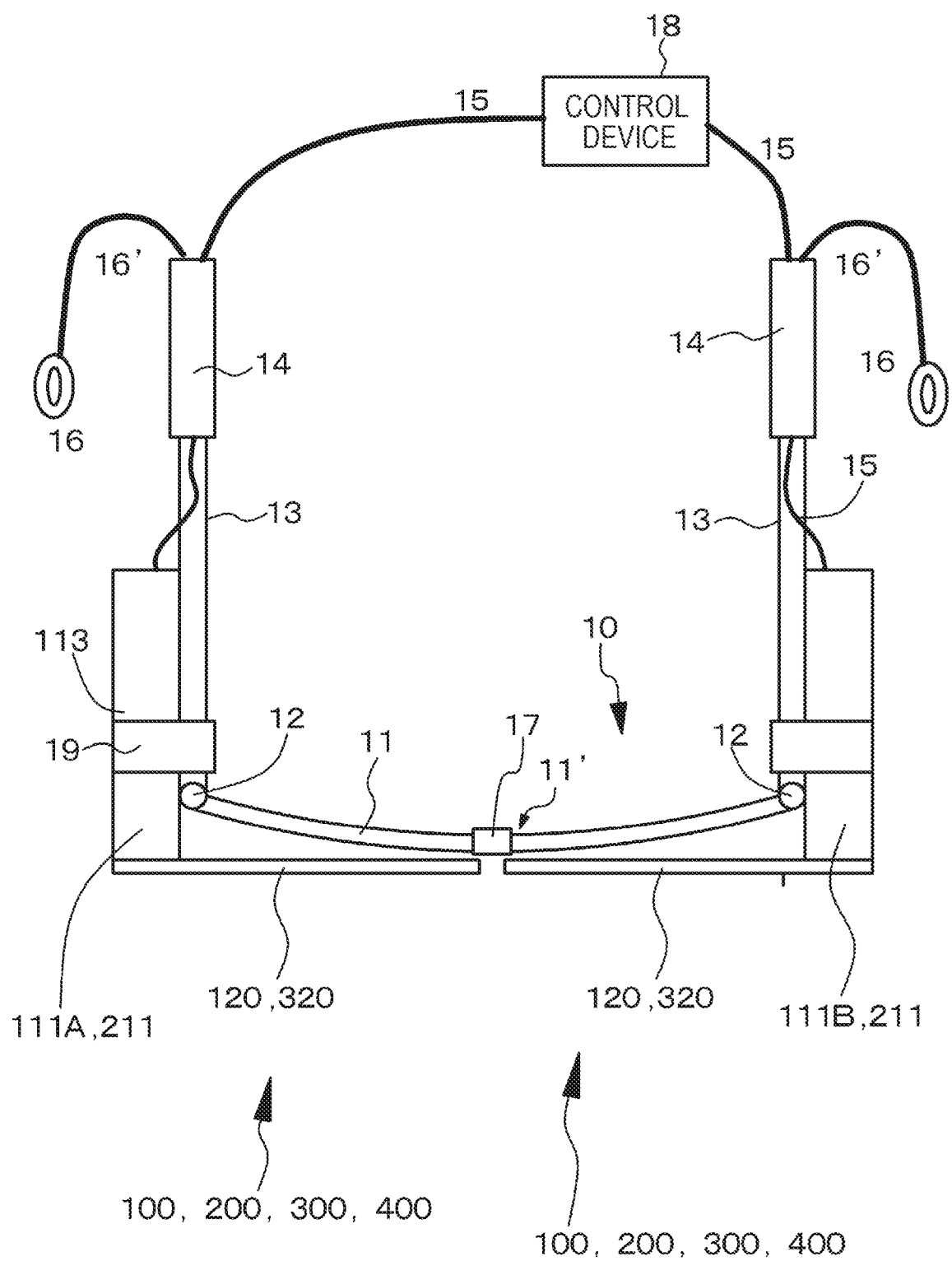
FIG. 2 is a schematic top view of the display device of Embodiment 1.
Figure 3:
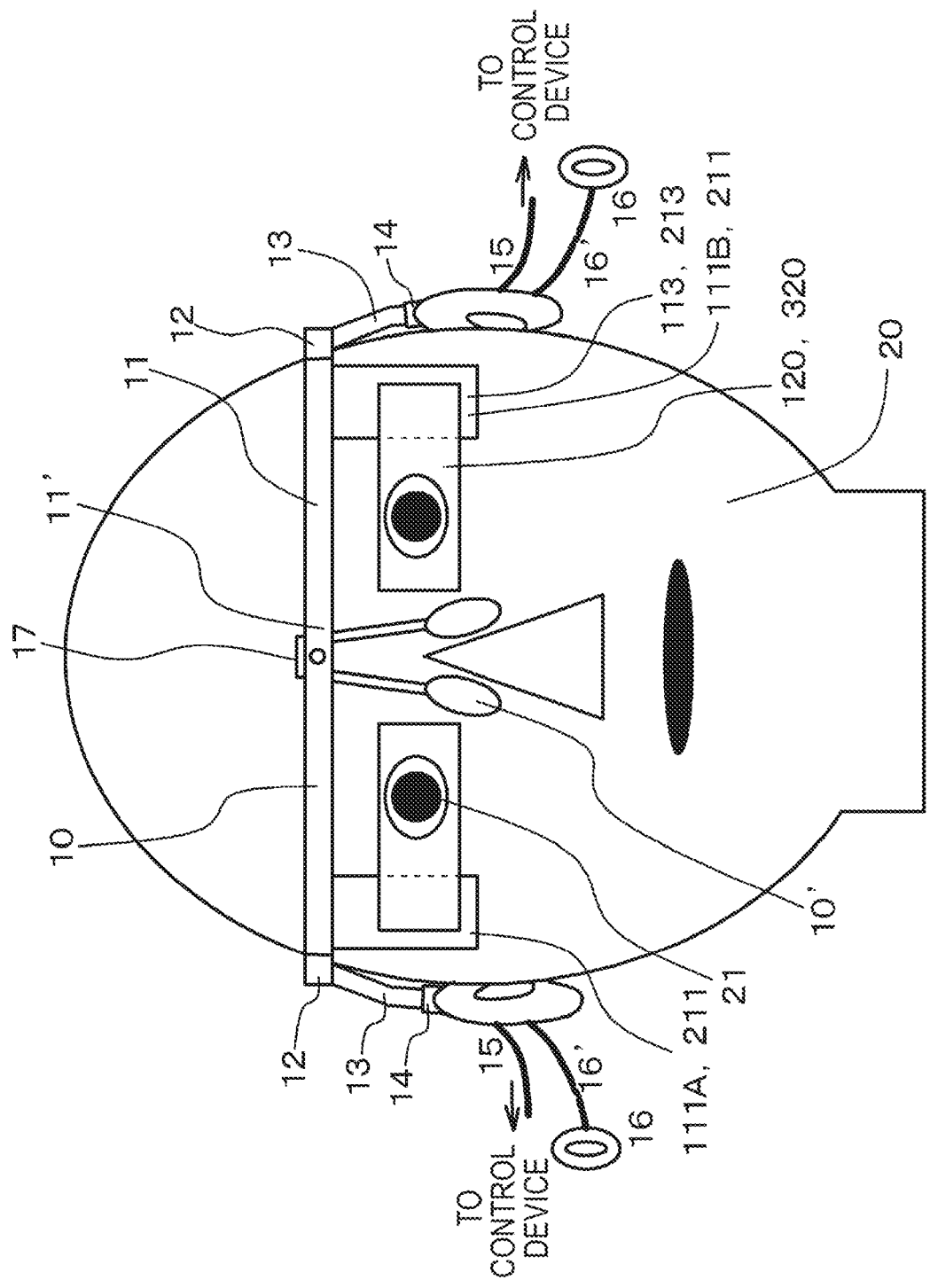
FIG. 3 is a schematic front view illustrating the display device of Embodiment 1.
Figure 4:
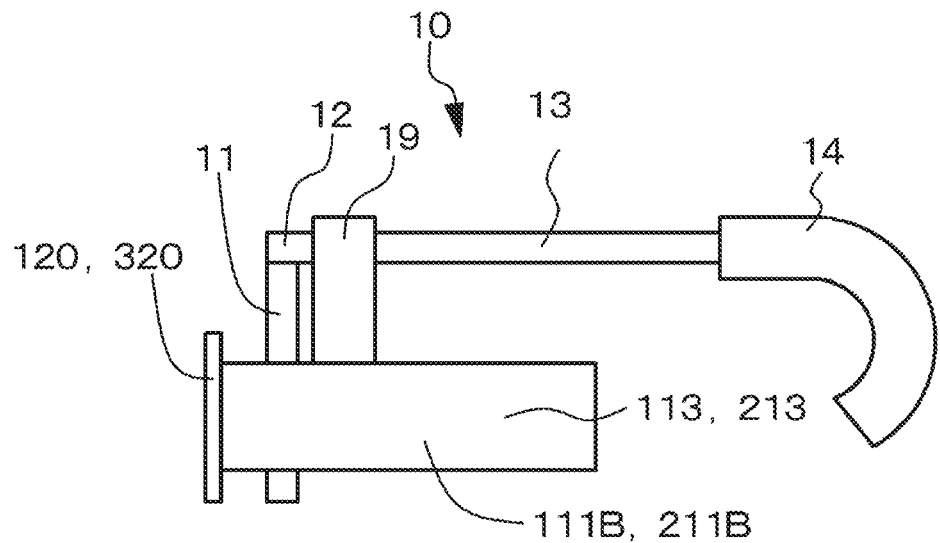
FIG. 4 is a schematic side view illustrating the display device of Embodiment 1.
Figure 5:
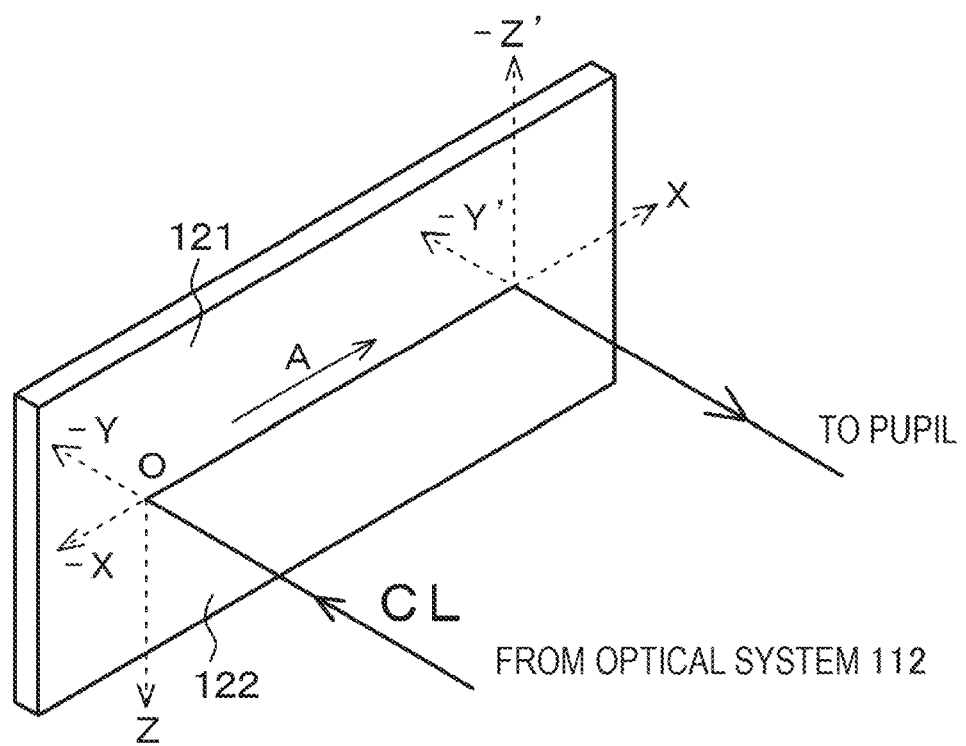
FIG. 5 is a diagram schematically illustrating propagation of light in a light guide plate constituting an image display device.

Embodiment 1 relates to a display device (specifically, an HMD) and an image display device of an embodiment of the present disclosure, and more particularly, to the first and third forms of image display devices). FIG. 1 is a conceptual diagram of an image display device in a display device of Embodiment 1, FIG. 2 is a schematic top view of the display device of Embodiment 1, FIG. 3 is a schematic front view illustrating the display device of Embodiment 1, and FIG. 4 is a schematic side view illustrating the display device of Embodiment 1. FIG. 5 schematically illustrates propagation of light in a light guide plate constituting an image display device.

The display device of Embodiment 1 and Embodiments 2 to 11 to be described later is more specifically an HMD, and includes (I) a frame (for example, the glasses-type frame 10) mounted on a head of an observer, and (II) image display devices 100, 200, 300, 400, 500, and 800 attached to the frame 10.

Here, the display device of Embodiment 1 or the display devices of Embodiments 2 to 11 to be described later is specifically a binocular display device including two image display devices or may be a monocular display device including one image display device. For example, image forming devices 111 and 211 display a single-color (for example, green) image.

In Embodiment 1 or Embodiments 2 to 11 to be described later, the image display devices 100, 200, 300, 400, 500, and 800 include (A) the image forming devices 111 and 211, (B) optical devices (light guide devices)120, 320, 520, and 820 on which light output from the image forming devices 111 and 211 is incident and from which the light is output, (C) light receiving devices 126, 326, 127, 327, 128, 328, and 825 that detect light output from the image forming devices 111 and 211, and (D) optical systems (parallel light outputting optical systems) 112 and 254 that convert light output from the image forming devices 111 and 211 into parallel light, and beams converted into the parallel light through the optical systems 112 and 254 are incident on and output to optical devices 120, 320, 520, and 820.

Here, the image display devices 100, 200, 300, 400, 500, and 800 may be mounted to be fixed to the frame or may be removably mounted. Here, the optical systems 112 and 254 are arranged between the image forming devices 111 and 211 and the optical devices 120, 320, 520, and 820. The beams converted into the parallel light through the optical systems 112 and 254 are incident on and output to the optical devices 120, 320, 520, and 820. The optical devices 120, 320, 520, and 820 are of a semi-transmissive type (see-through type). Specifically, at least a portion (more specifically, light guide plates 121, 321, and 821 and second polarizing units 140 and 340 or a semi-transmissive mirror 822 which will be described later) of an optical device facing both eyes of the observer are semi-transmissive (see-through).

In Embodiment 1 and Embodiments 2 to 9 to be described later, a point at which central incident light beams vertically incident on the optical devices 120 and 320 among light beams (central light beams CL) that are output from the centers of the image forming devices 111 and 211 and pass through image forming device side nodes of the optical systems 112 and 254 are incident on the optical devices 120 and 320 is referred to as an optical device central point O, an axial line that passes through the optical device central point O and is parallel to axial line directions of the optical devices 120 and 320 is referred to as an X axis, and an axial line that passes through the optical device central point O and matches normal lines of the optical devices 120 and 320 is referred to as a Y axis. Here, central points of the first polarizing units 130 and 330 are the optical device central point O. In other words, as illustrated in FIG. 5, in the image display devices 100, 200, 300, and 400, the central incident light beams CL that are output from the centers of the image forming devices 111 and 211 and pass through the image forming device side nodes of the optical systems 112 and 254 collide vertically with the light guide plates 121 and 321. In other words, the central incident light beams CL are incident on the light guide plates 121 and 321 at an incidence angle of 0°. In this case, the center of an image to be displayed matches vertical directions of first surfaces 122 and 322 of the light guide plates 121 and 321.

The optical devices 120 and 320 in Embodiment 1 and Embodiments 2 to 9 to be described later include (a) the light guide plates 121 and 321 that cause the incident light to propagate inside the light guide plate according to total reflection and then output the incident light, (b) the first polarizing units 130 and 330 that polarize the light incident on the light guide plates 121 and 321 so that the light incident on the light guide plates 121 and 321 is totally reflected inside the light guide plates 121 and 321, and (c) the second polarizing units 140 and 340 that polarize light propagating inside the light guide plates 121 and 321 according to total reflection so that part of light propagating inside the light guide plates 121 and 321 according to total reflection is output from the light guide plates 121 and 321.

Here, the second polarizing units 140 and 340 are formed of a reflective volume hologram diffraction grating. In other words, the second polarizing units 140 and 340 functions as a semi-transmissive mirror.

In Embodiment 1 or Embodiments 2 to 5 to be described later, the optical devices 120 and 320 include the first form of image display device. Specifically, the second polarizing units 140 and 340 include first portions 141 and 341 that polarize light propagating inside the light guide plates 121 and 321 according to total reflection toward the observer, and second portions 142 and 342 that polarize the light propagating inside the light guide plates 121 and 321 according to total reflection toward the light receiving devices 126 and 326.

Alternatively, in the image display devices 100, 200, 300, and 400 of Embodiment 1 and Embodiments 2 to 5 to be described later, the optical devices 120 and 320 include a light semi-reflecting member that reflect part of light output from the image forming devices 111 and 211 and transmit the remaining part, and the light receiving devices 126 and 326 detect the light passing through the light semi-reflecting member. Here, specifically, the light semi-reflecting member is formed of the second polarizing units 140 and 340.

In Embodiment 1 and Embodiments 2 to 11 to be described later, the light receiving devices 126, 326, 127, 327, 128, 328, and 825 include a so-called line sensor in which light receiving elements are one-dimensionally arranged or a so-called imaging element in which light receiving elements are arranged in a 2D matrix.

Alternatively, in Embodiment 1 and Embodiments 2 to 11 to be described later, the light receiving devices 126, 326, 127, 327, 128, 328, and 825 are optically connected to the optical devices 120, 320, 520, and 820. In other words, the light receiving devices 126, 326, 127, 327, 128, 328, and 825 employ not only a form in which the light receiving devices 126, 326, 127, 327, 128, 328 are connected directly to the optical devices 120, 320, 520, and 820 but also a form in which the light receiving devices 126, 326, 127, 327, 128, 328 are connected so that light is input via an adhesive member, a light guide member, or the like. Further, as light detected by the light receiving devices 126, 326, 127, 327, 128, 328, and 825, part of light output from the image forming devices 111 and 211 or part of light propagating through the optical devices 120, 320, 520, and 820 is sufficient.

In Embodiment 1, the first polarizing unit 130 and the second polarizing unit 140 are disposed inside the light guide plate 121. The first polarizing unit 130 reflects light incident on the light guide plate 121, and the second polarizing unit 140 transmits and reflects light propagating through the inside of the light guide plate 121 according to total reflection a plurality of times. That is, the first polarizing unit 130 functions as a reflecting mirror, and the second polarizing unit 140 functions as a semi-transmissive mirror. More specifically, the first polarizing unit 130 provided inside the light guide plate 121 includes a light reflecting film (a type of mirror) formed of aluminum (Al), which reflects light incident on the light guide plate 121. On the other hand, the second polarizing unit 140 provided inside the light guide plate 121 is formed by a multilayer laminated structure in which a plurality of dielectric laminated films are laminated. The dielectric laminated film is formed by, for example, a $TiO_2$ film as a high-dielectric-constant material and a $SiO_2$ film as a low-dielectric-constant material. A multi-layer laminated structure in which a plurality of dielectric laminated films are laminated is disclosed in Japanese Unexamined Patent Application Publication (Translation of PCT Application) 2005-521099. Although a six-layer dielectric laminated film is illustrated in the drawing, the present disclosure is not limited thereto. A thin section formed of the same material as the material constituting the light guide plate 121 is sandwiched between dielectric laminated films. In the first polarizing unit 130, the parallel light incident on the light guide plate 121 is reflected (or diffracted) so that the parallel light incident on the light guide plate 121 is totally reflected inside the light guide plate 121. On the other hand, in the second polarizing unit 140, the parallel light propagating through the inside of the light guide plate 121 according to total reflection is reflected (or diffracted) a plurality of times, and output toward the pupil 21 of the observer in a state of parallel light from the light guide plate 121.

For the first polarizing unit 130, it is only necessary that a slant surface on which the first polarizing unit 130 is to be formed on the light guide plate 121 be provided by cutting out a portion 124 on which the first polarizing unit 130 of the light guide plate 121 is provided, and the cut-out portion 124 of the light guide plate 121 be adhered to the first polarizing unit 130 after a light reflecting film is vacuum evaporated on the slant surface. In addition, for the second polarizing unit 140, it is only necessary that a multilayer laminated structure in which a plurality of membranes of the same material (e.g., glass) as the material constituting the light guide plate 121 and a plurality of dielectric laminated films (for example, formable by vacuum evaporation) are laminated be manufactured, a slant surface be formed by cutting out a portion 125 on which the second polarizing unit 140 of the light guide plate 121 is provided, the multilayer laminated structure be adhered to the slant surface, and the external form be arranged by polishing or the like. Thereby, the optical device 120 having the first polarizing unit 130 and the second polarizing unit 140 provided inside the light guide plate 121 can be obtained. Here, the first polarizing unit 130 may be configured with a semi-transmissive mirror that reflects part of light incident on the light guide plates 121 and 321. In the second polarizing unit 140, the dielectric laminated film 140A positioned on the end portion side of the light guide plate 121 at the second polarizing unit side may be replaced with a light reflecting film.

Here, in Embodiment 1 or any one of Embodiments 2 to 10 to be described later, the light guide plates 121 and 321, and 821 are formed of an optical glass material or a plastic material. Further, in Embodiment 1 or any one of Embodiments 2 to 9 to be described later, the light guide plate 121 or 321 has two parallel surfaces (a first surface 122 or 322 and a second surface 123 or 323) extending in parallel to the light propagating direction (X direction) according to internal total reflection of the light guide plate 121 or 321. The first surface 122 or 322 and the second surface 123 or 323 face each other. Parallel light is incident from the first surface 122 or 322 corresponding to a light incidence surface, and the incident parallel light propagates through the inside according to total reflection and then is output from the first surface 122 or 322 corresponding to a light output surface. However, the present disclosure is not limited thereto, and the light incidence surface may be formed by the second surface 123 or 323, and the light output surface may be formed by the first surface 122 or 322. In Embodiment 1, the light receiving device 126 is mounted on the light output surface.

In Embodiment 1 or 4 to be described later, the image forming device 111 is the first form of image forming device, which has a plurality of pixels arranged in a 2D matrix. Specifically, the image forming device 111 includes a reflective spatial light modulating device 150 and a light source 153 formed by LEDs that emits white light. Each entire image forming device 111 is fitted inside a housing 113 (denoted by a dashed-dotted line in FIG. 1), and an opening portion (not illustrated) is provided in the housing 113, and light is output from the optical system (the parallel light outputting optical system, the collimating optical system) 112 through the opening portion. The reflective spatial light modulating device 150 is formed by an LCD device (LCD) 151 formed by an LCOS as a light valve and a polarization beam splitter 152 that reflects part of the light output from the light source 153 to guide the reflected light to the LCD device 151 and passes part of light reflected by the LCD device 151 to guide the passed light to the optical system 112. The liquid crystal display device 151 includes a plurality (for example, 640×480) of pixels (liquid crystal cells) arranged in a 2D matrix. The polarization beam splitter 152 has a well-known configuration and structure. Unpolarized light output from the light source 153 collides with the polarization beam splitter 152. The polarization beam splitter 152 passes and outputs a P-polarized component outside the system. On the other hand, an S-polarized component is reflected by the polarization beam splitter 152, incident on the LCD device 151, reflected inside the LCD device 151, and output from the LCD device 151. Here, a large number of P-polarized components are included in light output from pixels used for displaying "white" in the light output from the LCD device 151, and a large number of S-polarized components are included in light output from pixels used for displaying "black." Accordingly, the P-polarized component within the light that is output from the LCD device 151 and collides with the polarization beam splitter 152 passes through the polarization beam splitter 152 and is guided to the optical system 112. On the other hand, the S-polarized component is reflected by the polarization beam splitter 152 and returned to the light source 153. The optical system 112, for example, includes a convex lens. To generate parallel light, the image forming device 111 (more specifically, the LCD device 151) is disposed at a place (position) of a focal distance of the optical system 112.

The frame 10 is formed by a front portion 11 arranged on the front side of the observer, two temple portions 13 pivotably mounted on both ends of the front portion 11 via hinges 12, and ear bend portions (also referred to as tip cells or ear pads) 14 mounted on tip end portions of the temple portions 13. In addition, nose pads (not illustrated) are mounted thereon. That is, the assembly of the frame 10 and the nose pads has basically substantially the same structure as ordinary glasses. Further, each housing 113 is mounted attachable to or detachable from the temple portion 13 using a mounting member 19. The frame 10 is manufactured using metal or plastic. Each housing 113 may be fixed on the temple portion 13 using the mounting member 19 so as not to be attachable to or detachable from the temple portion 13. Further, when the observer owns and wears glasses, each housing 113 may be attachable to or detachable from the temple portion of the frame of the glasses owned by the observer using the mounting member 19.

Further, wirings (signal lines, power lines, and the like) 15 extending from one image forming device 111A extend from the tip end portion of the ear bend portion 14 toward the outside via the temple portion 13 and the inside of the ear bend portion 14, and are connected to the control device (the control circuit or the control unit) 18. In addition, each of the image forming devices 111A and 111B has a headphone unit 16, and a headphone wiring 16' extending from each of the image forming devices 111A and 111B extends from the tip end portion of the ear bend portion 14 to the headphone unit 16 via the temple portion 13 and the inside of the ear bend portion 14. More specifically, the headphone wiring 16' extends from the tip end portion of the ear bend portion 14 so as to wrap around the rear side of the auricle (auditory capsule) and extends to the headphone unit 16. According to such a configuration, the display device can be neatly formed without giving an impression that the headphone unit 16 and the headphone wiring 16' are cluttered.

The wirings (signal lines, power lines, and the like) 15 are connected with the control device (control circuit) 18 as described above. In the control device 18, processing for image display is performed. The control device 18 may be configured with a known circuit.

In addition, an imaging device 17 having a solid-state imaging device formed by a CCD or CMOS sensor and a lens (these are not illustrated) are mounted on a center portion 11' of the front portion 11 using an appropriate mounting member (not illustrated). A signal output from the imaging device 17 is transmitted to the image forming device 111A via a wiring (not illustrated) extending from the imaging device 17.

In the image display devices 100, 200, 300, 400, 500, and 800 of Embodiment 1 and Embodiments 2 to 11 to be described later, in order to detect the occurrence of an abnormality, preferably, a test signal is transmitted to the image forming devices 111 and 211, for example, during one image display frame at intervals of a certain period of time (for example, at intervals of 10 seconds or 1 minute), a test pattern is displayed on the image forming devices 111 and 211, and the relevant test pattern is detected by the light receiving devices 126, 326, 127, 327, 128, 328, and 825. Alternatively, preferably, when the operations of the image display devices 100, 200, 300, 400, 500, and 800 start or end, the test signal is transmitted to the image forming devices 111 and 211, the test pattern is displayed on the image forming devices 111 and 211, and the relevant test pattern is detected by the light receiving devices 126, 326, 127, 327, 128, 328, and 825. When the image display devices 100, 200, 300, 400, 500, and 800 operate normally, the test pattern is received in certain pixels of the light receiving devices 126, 326, 127, 327, 128, 328, and 825. However, when an abnormality occurs in the image display devices 100, 200, 300, 400, 500, and 800, the test pattern is received in pixels deviated from certain pixels of the light receiving devices 126, 326, 127, 327, 128, 328, and 825. Alternatively, when an abnormality occurs in the image display devices 100, 200, 300, 400, 500, and 800, there are also cases in which intensity of light received by the light receiving devices 126, 326, 127, 327, 128, 328, and 825 is reduced. Thus, when the light receiving devices 126, 326, 127, 327, 128, 328, and 825 detect the occurrence of the abnormality in the image display devices 100, 200, 300, 400, 500, and 800, the image display devices 100, 200, 300, 400, 500, and 800 or the display device output a warning.

Alternatively, in the image display devices 100, 200, 300, 400, 500, and 800 of Embodiment 1 and Embodiments 2 to 11 to be described later, the operations of the image forming devices 111 and 211 are controlled based on the detection results of the light receiving devices 126, 326, 127, 327, 128, 328, and 825. In other words, the positions of images output from the image forming devices 111 and 211 are controlled based on the detection results of the light receiving devices 126, 326, 127, 327, 128, 328, and 825. Specifically, when the test pattern is received in the pixels deviated from the certain pixels of the light receiving devices 126, 326, 127, 327, 128, 328, and 825, preferably, image signals to be output to the image forming devices 111 and 211 are compensated to eliminate the deviation. More specifically, for movement of an image in the horizontal direction, it is preferable that a signal in which a position of an image in the horizontal direction is changed by +i pixels or −i pixels be generated in the control device 18 as a display position correction signal. Alternatively, it is preferable that a signal in which a timing of a horizontal synchronous signal is changed by +i pixels or −i pixels be generated in the control device 18. Further, for movement of an image in the vertical direction, it is preferable that a signal in which a position of an image in the vertical direction is changed by +j pixels or −j pixels be generated in the control device 18 as the display position correction signal, and alternatively, it is preferable that a signal in which a timing of a vertical synchronous signal is changed by +j pixels or −j pixels be generated in the control device 18. In other words, it can be implemented by delaying or advancing a timing for a memory read position of the image, or it can be implemented by deviating timings of the vertical synchronous signal and the horizontal synchronous signal. Further, it is preferable that the display position correction signal be stored in the control device 18 as the display position control signal, and it is preferable that the display position control signal be added to the image signal for forming the image in the control device 18. Alternatively, an output angle of light output from the optical devices 120 and 320 may be controlled, and in order to compensate for distortion occurring in the images output from the image forming devices 111 and 211, signals for compensating for distortion occurring in the images may be weighted to the image signals to be output to the image forming devices 111 and 211 to remove the distortion. In other words, the signals for compensating for distortion occurring in the images output from the optical devices 120, 320, 520, and 820 may be output to the image forming devices 111 and 211 based on the detection results of the light receiving devices 126, 326, 127, 327, 128, 328, and 825.

Alternatively, when intensity of light received by the light receiving devices 126, 326, 127, 327, 128, 328, and 825 is reduced, it is preferable to perform processing (for example, an increase in light intensity of the light source 153) of increasing light intensity of the images formed in the image forming devices 111 and 211.

As described above, the image display device or the display device of Embodiment 1 includes the light receiving device that detects light output from the image forming device, and thus it is possible to immediately detect whether or not an image to be displayed on an image display device or light output from an optical device is abnormal with a high degree of accuracy.

Embodiment 2

Embodiment 2 is a modification of Embodiment 1 and relates to fourth and sixth forms of image display devices. In Embodiment 2, the image forming device 111 includes the light source 153 formed of a GaN semiconductor laser element. Further, the wavelength of light output from the light source 153 is controlled based on the detection result of the light receiving device 126.

Generally, an oscillation wavelength (a wavelength $\lambda$ output from a semiconductor laser element) of a semiconductor laser element is shifted to a long wavelength side with an increase in the temperature of a bonded surface. When the wavelength $\lambda$ output from the semiconductor laser element is shifted to the long wavelength side, as will be described later, the deviation from the Bragg condition represented by Expression (A) occurs, and thus the image quality of the image observed by the observer is lowered. However, in a GaN semiconductor laser element formed by laminating a GaN compound semiconductor layer, an oscillation wavelength (the wavelength $\lambda$ output from the semiconductor laser element) of the semiconductor laser element is shifted to a short wavelength side with an increase in a driving current. Thus, it is possible to compensate the oscillation wavelength of the semiconductor laser element shifted to the long wavelength side with the increase in the temperature. In other words, in order to detect whether or not the wavelength of light output from the light source 153 has significantly changed, the test signal is transmitted to the image forming device 111 during one image display frame at intervals of a certain period of time (for example, at intervals of 10 seconds or 1 minute), the test pattern is displayed on the image forming device 111, and the relevant test pattern is detected by the light receiving device 126. When the wavelength of light output from the light source 153 does not significantly change, since the deviation from the Bragg condition does not occur, the test pattern is received in a certain pixel of the light receiving device 126. However, when the wavelength of light output from the light source significantly changes, specifically, when the wavelength of light output from the light source increases due to heat generation of the light source, the diffraction angle changes, and thus the test pattern is received in a pixel deviated from the certain pixel of the light receiving device 126. Alternatively, there are also cases in which intensity of light received by the light receiving device 126 is reduced. Such a phenomenon causes an image observed by the observer to be smeared or distorted. Thus, when such a phenomenon is detected by the light receiving device 126, it is preferable that the wavelength of light output from the light source 153 be shifted to the short wavelength side to return to the original wavelength by increasing the driving current of the GaN semiconductor laser element constituting the light source 153 under control of the control device 18. Here, the temperature of the light source 153 may be measured in conjunction with the detection of the test pattern by the light receiving device 126.

Because the image display device and the display device of Embodiment 2 have substantially the same configuration and structure as the image display device and the display device of Embodiment 1 except for the above-described points, a detailed description thereof is omitted.

Embodiment 3

Figure 6:
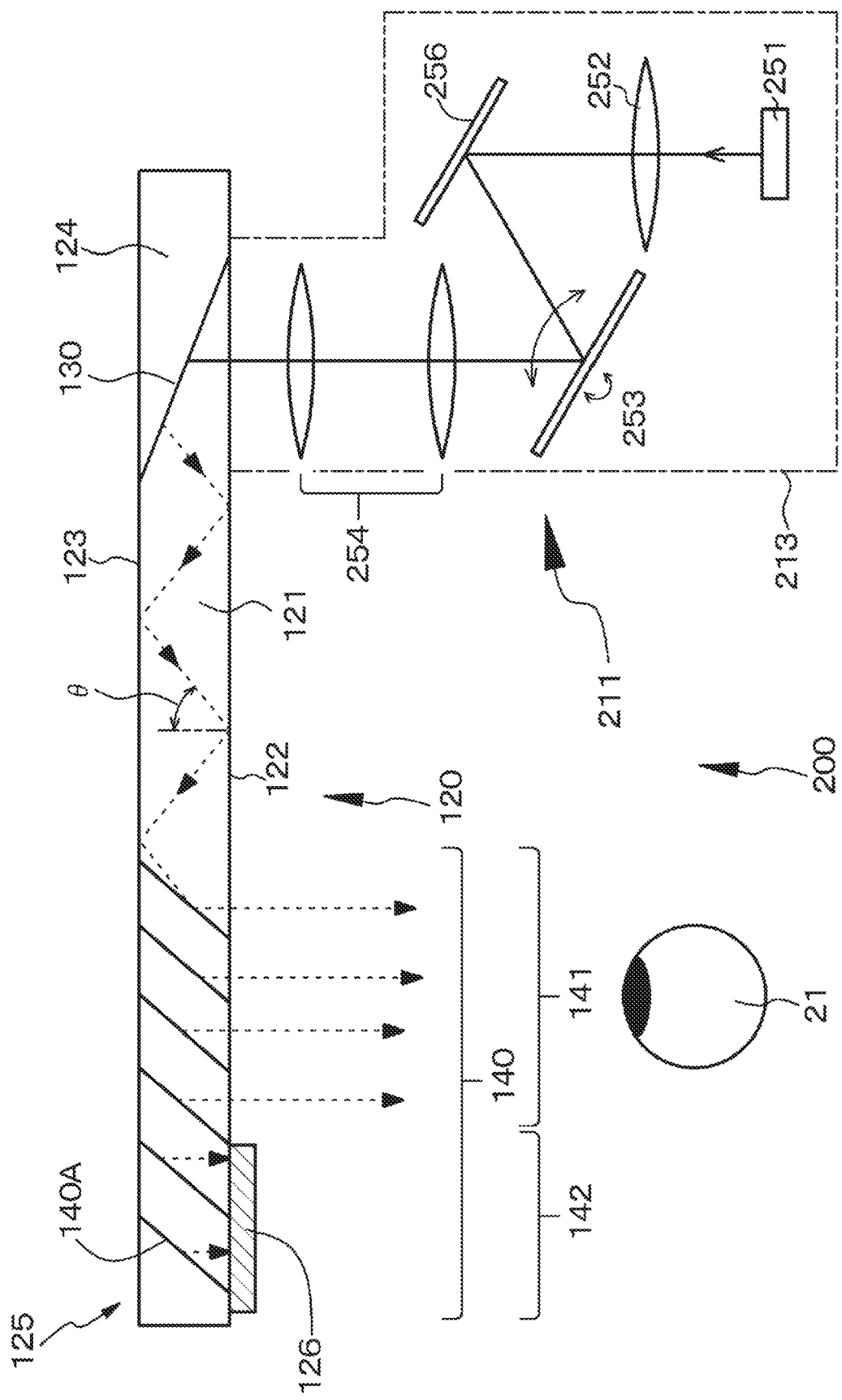
FIG. 6 is a conceptual diagram of an image display device in a display device of Embodiment 3.

Embodiment 3 is a modification of Embodiment 1 or Embodiment 2. As illustrated in FIG. 6 that is a conceptual diagram of the image display device 200 in the display device (head mounted display) of Embodiment 3, in Embodiment 3, the image forming device 211 is configured with the second form of image forming device. In other words, a light source 251 and a scanning unit 253 that scans parallel light output from the light source 251 are provided. More specifically, the image forming device 211 includes (I) the light source 251, (II) a collimating optical system 252 that converts light output from the light source 251 into parallel light, (III) the scanning unit 253 that scans the parallel light output from the collimating optical system 252, and (IV) the relay optical system 254 that relays and outputs the parallel light scanned by the scanning unit 253.

The whole image forming device 211 is received in a housing 213 (indicated by an alternate long and short dash line in FIG. 6), an opening portion (not illustrated) is formed in the housing 213, and light is output from the relay optical system 254 through the opening portion. Each housing 213 is removably mounted on the temple portion 13 through the mounting member 19.

The light source 251 is configured with a light emitting element that emits white light. Alternatively, the light source 251 is formed of a GaN semiconductor laser element. Light output from the light source 251 has positive optical power as a whole and is incident on the collimating optical system 252 and output as parallel light. Then, the parallel light is reflected by the total reflecting mirror 256, scanned horizontally and vertically by the scanning unit 253 including an MEMS that has a micro mirror rotatable in a 2D direction to scan incident parallel light two dimensionally, and converted into a type of 2D image, and virtual pixels (for example, the number of pixels may be the same as in Embodiment 1) are generated. Then, light from the virtual pixels passes through the relay optical system (the parallel light outputting optical system) 254 configured with a known relay optical system, and parallel light beams are incident on the optical device 120.

The optical device 120, which the parallel light beams formed by the relay optical system 254 are incident on, guided to, and output to, has substantially the same configuration and structure as the optical device described in Embodiment 1 or Embodiment 2, and thus a detailed description thereof is omitted. The display device of Embodiment 3 has substantially the same configuration and structure as the display device of Embodiment 1 or Embodiment 2 except for the difference in the image forming device 211, and thus a detailed description thereof is omitted.

Embodiment 4

Figure 7:
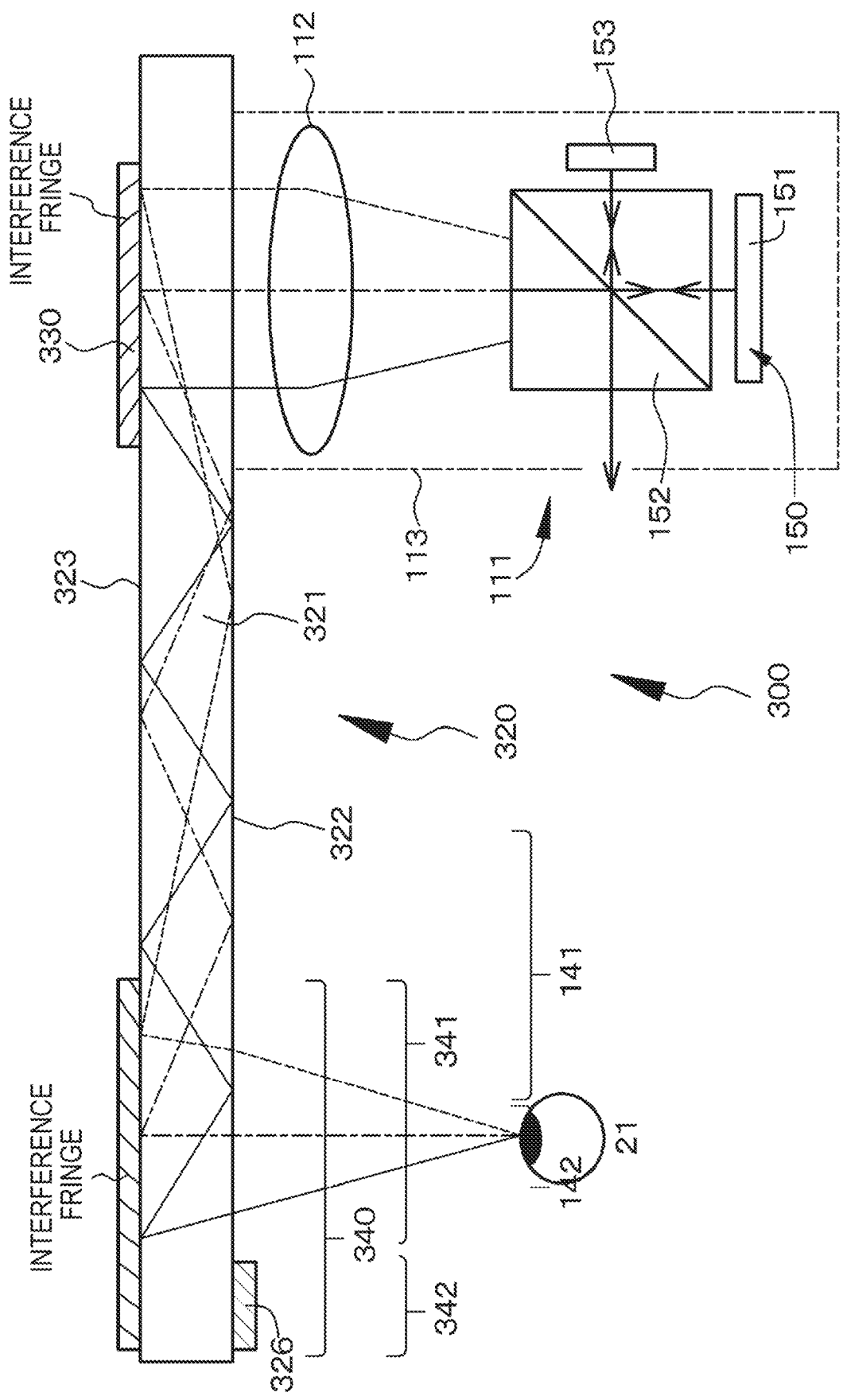
FIG. 7 is a conceptual diagram of an image display device in a display device of Embodiment 4.
Figure 8:
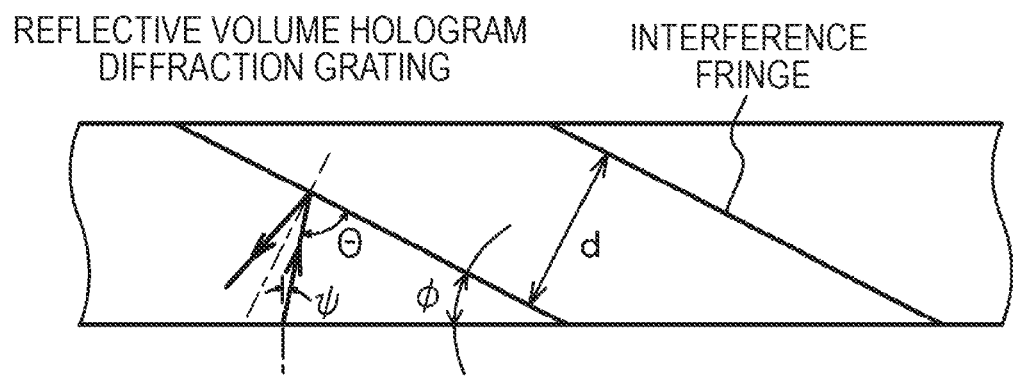
FIG. 8 is a schematic cross-sectional view illustrating an enlarged portion of a reflective volume hologram diffraction grating in a display device of Embodiment 4.

Embodiment 4 is a modification of Embodiment 1 or Embodiment 2. A conceptual diagram of an image display device of a display device (head mounted display) of Embodiment 4 is illustrated in FIG. 7. A schematic cross-sectional view in which a part of the reflective volume hologram diffraction gratings is enlarged is illustrated in FIG. 8. In Embodiment 4, the image forming device 111 is configured with the first form of image forming device, similarly to Embodiment 1 and Embodiment 2. The optical device 320 is the same basic configuration and structure as the optical device 120 of Embodiment 1 or Embodiment 2 except for the difference in the configuration and structure of the first polarizing unit and the second polarizing unit.

In Embodiment 4, the first polarizing unit and the second polarizing unit are disposed on a surface of a light guide plate 321 (specifically, a second surface 323 of the light guide plate 321). The first polarizing unit diffracts light incident on the light guide plate 321, and the second polarizing unit diffracts light propagating through the inside of the light guide plate 321 according to total reflection a plurality of times. Here, the first polarizing unit and the second polarizing unit are formed by diffraction grating elements, specifically, reflective diffraction grating elements, and more specifically, reflective volume hologram diffraction gratings. In the following description, the first polarizing unit formed by the reflective volume hologram diffraction grating is referred to as a "first diffraction grating member 330" for convenience, and the second polarizing unit formed by the reflective volume hologram diffraction grating is referred to as a "second diffraction grating member 340" for convenience.

In Embodiment 4 or Embodiment 5 to be described later, the first diffraction grating member 330 and the second diffraction grating member 340 can be formed by laminating one diffraction grating layer. In each diffraction grating layer formed by a photopolymer material, interference fringes corresponding to one type of wavelength band (or wavelength) are formed, and manufactured using a method of the related art. The pitch of the interference fringes formed in the diffraction grating layer (diffractive optical element) is constant, and the interference fringes have a linear shape and is in parallel to the Z axis. The axial lines of the first diffraction grating member 330 and the second diffraction grating member 340 are parallel to the X axis, and the normal lines thereof are parallel to the Y axis.

A schematic partial cross-sectional view in which the reflective volume hologram diffraction grating is enlarged is illustrated in FIG. 8. In the reflective volume hologram diffraction grating, interference fringes having a slant angle $\phi$ are formed. Here, the slant angle $\phi$ represents an angle formed by the surface of the reflective volume hologram diffraction grating and the interference fringes. The interference fringes are formed from the inside of the reflective volume hologram diffraction grating to the surface thereof. The interference fringes satisfy a Bragg condition. Here, the Bragg condition is a condition that satisfies the following Expression (A). In Expression (A), m represents a positive integer, $\lambda$ represents a wavelength, d represents the pitch of the grating surface (a gap of virtual planes including the interference fringes in the direction of the normal line), and $\Theta$ represents a complementary angle of an angle at which light is incident on the interference fringes. In addition, when light penetrates into the diffraction grating member at an incidence angle $\psi$, the relationship among the complementary angle $\Theta$, the slant angle $\phi$, and the incidence angle $\psi$ is shown in Expression (B).

$$m \cdot \lambda = 2 \cdot d \cdot \sin(\Theta) \qquad (A)$$

$$\Theta = 90° - (\phi + \psi) \qquad (B)$$

As described above, the first diffraction grating member 330 is arranged on (adhered to) the second surface 323 of the light guide plate 321 and diffracts and reflects parallel light incident on the light guide plate 321 so that the parallel light incident from the first surface 322 to the light guide plate 321 is totally reflected inside the light guide plate 321. Further, as described above, the second diffraction grating member 340 is arranged on (adhered to) the second surface 323 of the light guide plate 321 and diffracts and reflects the parallel light propagating through the inside of the light guide plate 321 according to total reflection a plurality of times, and the parallel light is directly output from the first surface 322 of the light guide plate 321.

Then, the parallel light propagates through the inside of the light guide plate 321 according to total reflection and then is output therefrom. At this time, because the light guide plate 321 is thin, and a path of light that propagates through the inside of the light guide plate 321 is long, the number of total reflections until the parallel light reaches the second diffraction grating member 340 differs according to a view angle. In further detail, the number of reflections of parallel light incident at an angle in a direction close to the second diffraction grating member 340 among parallel light beams incident on the light guide plate 321 is less than that of parallel light incident on the light guide plate 321 at an angle in a direction away from the second diffraction grating member 340. This is because parallel light incident on the light guide plate 321 at an angle close to the second diffraction grating member 340 among parallel light beams diffracted and reflected in the first diffraction grating member 330 has a smaller angle formed with the normal line of the light guide plate 321 when light propagating through the inside of the light guide plate 321 collides with the inner surface of the light guide plate 321 than parallel light incident on the light guide plate 321 at an angle in a direction reverse thereto. In addition, the shape of the interference fringes formed inside the second diffraction grating member 340 and the shape of the interference fringes formed inside the first diffraction grating member 330 are symmetrical with respect to the virtual plane vertical to the axis of the light guide plate 321.

A light guide plate 321 in accordance with Embodiment 5 to be described later also basically has the same configuration and structure as the light guide plate 321 described above.

The image display device and the display device of Embodiment 4 have substantially the same configuration and structure as the image display device and the display device of Embodiment 1 or Embodiment 2 except for the difference in the optical device 320, and thus a detailed description thereof is omitted.

Embodiment 5

Figure 9:
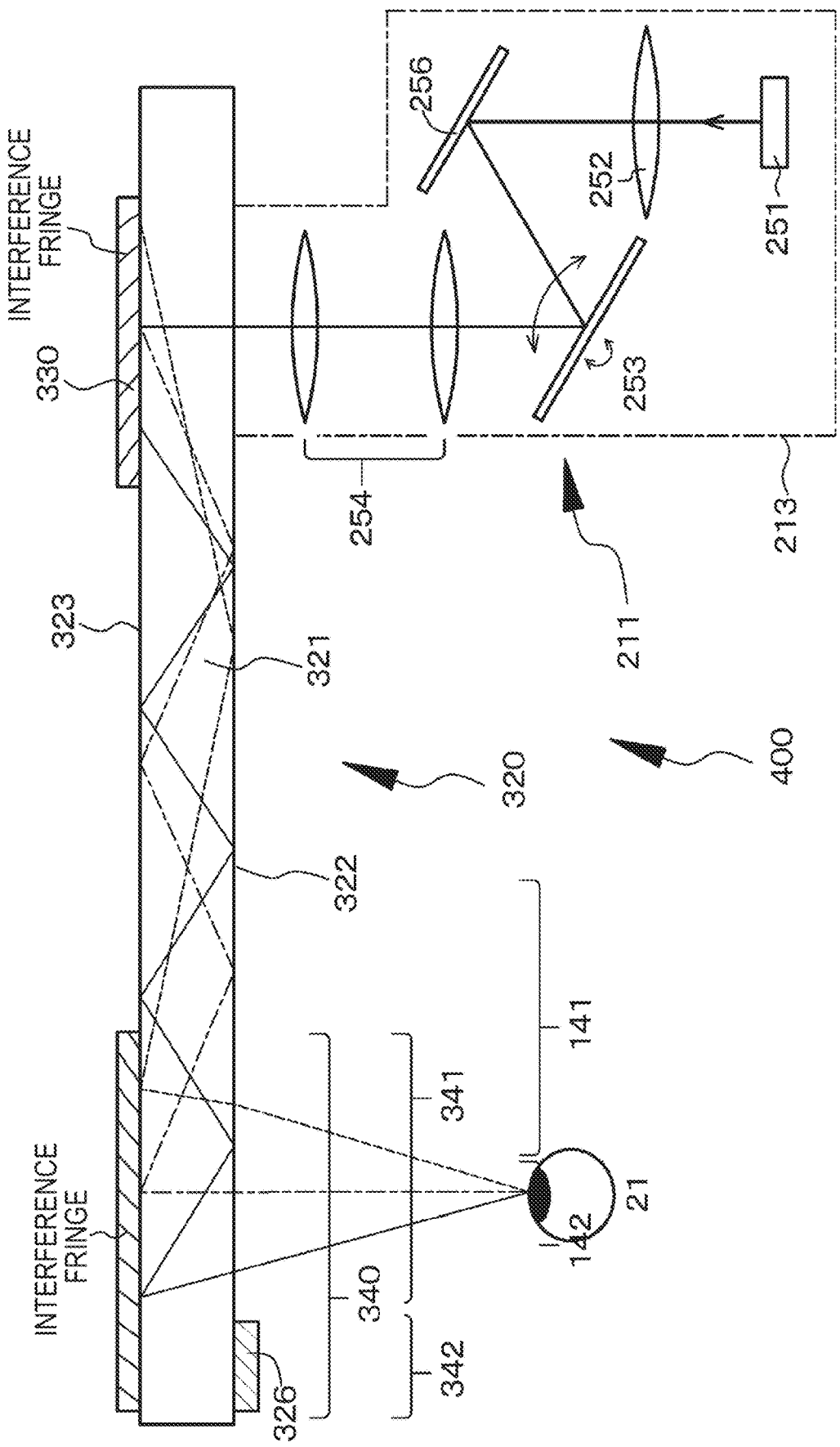
FIG. 9 is a conceptual diagram of an image display device in a display device of Embodiment 5.

Embodiment 5 is a modification of Embodiment 4. FIG. 9 is a conceptual diagram of an image display device in a display device (head mounted display) of Embodiment 5. In the image display device 400 of Embodiment 5, the light source 251, the collimating optical system 252, the scanning unit 253, the parallel light outputting optical system (the relay optical system 254), and the like have substantially the same configuration and structure (the second form of image forming device) as in Embodiment 3. Further, the optical device 320 of Embodiment 5 has substantially the same configuration and structure as the optical device 320 of Embodiment 4. The display device of Embodiment 5 has substantially the same configuration and structure as the display device of Embodiment 3 except for the difference described above, and thus a detailed description thereof is omitted.

Embodiment 6

Figure 10:
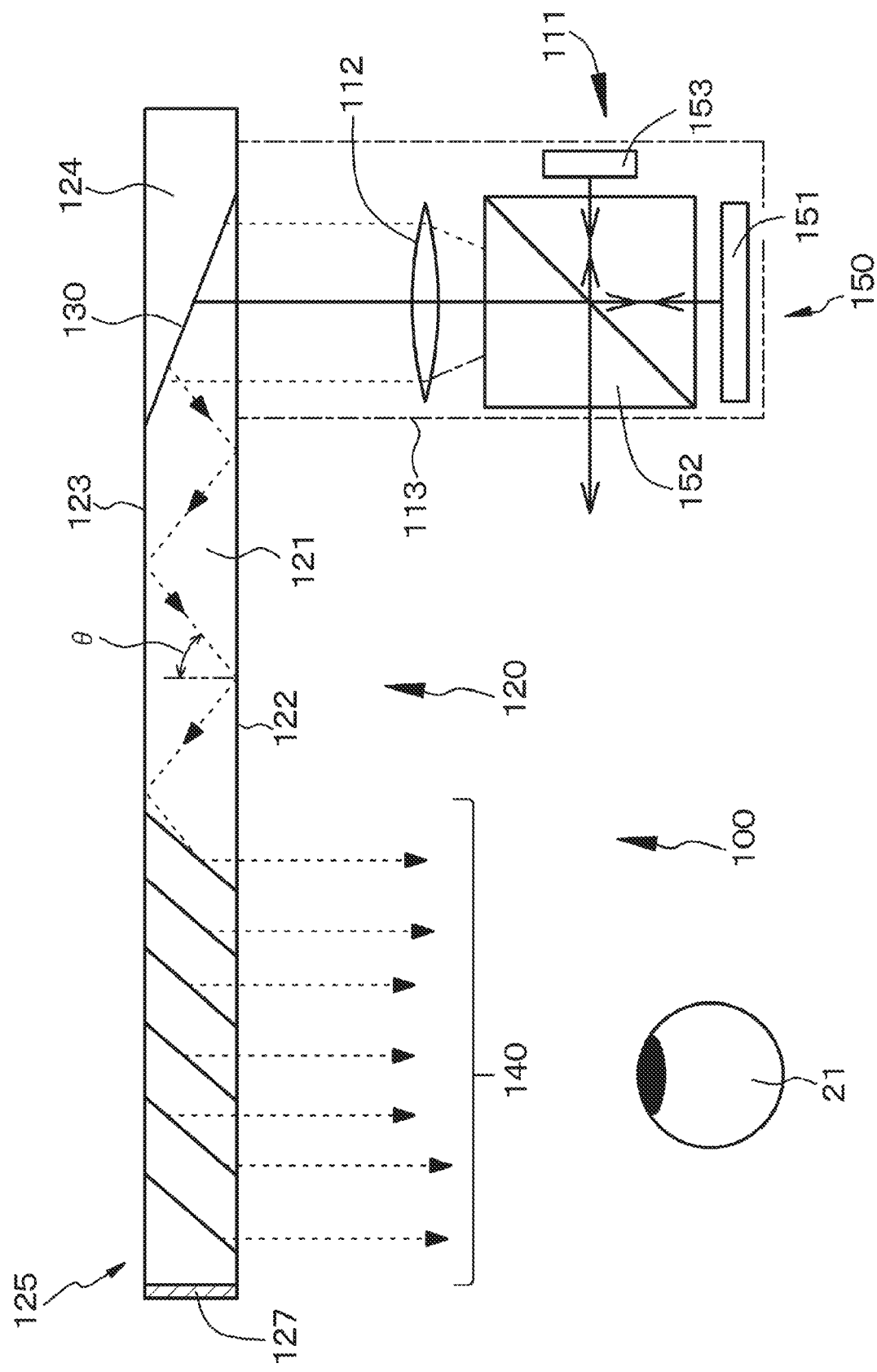
FIG. 10 is a conceptual diagram of an image display device in a display device of Embodiment 6, and illustrates a modification of the display device of Embodiment 1.
Figure 11:
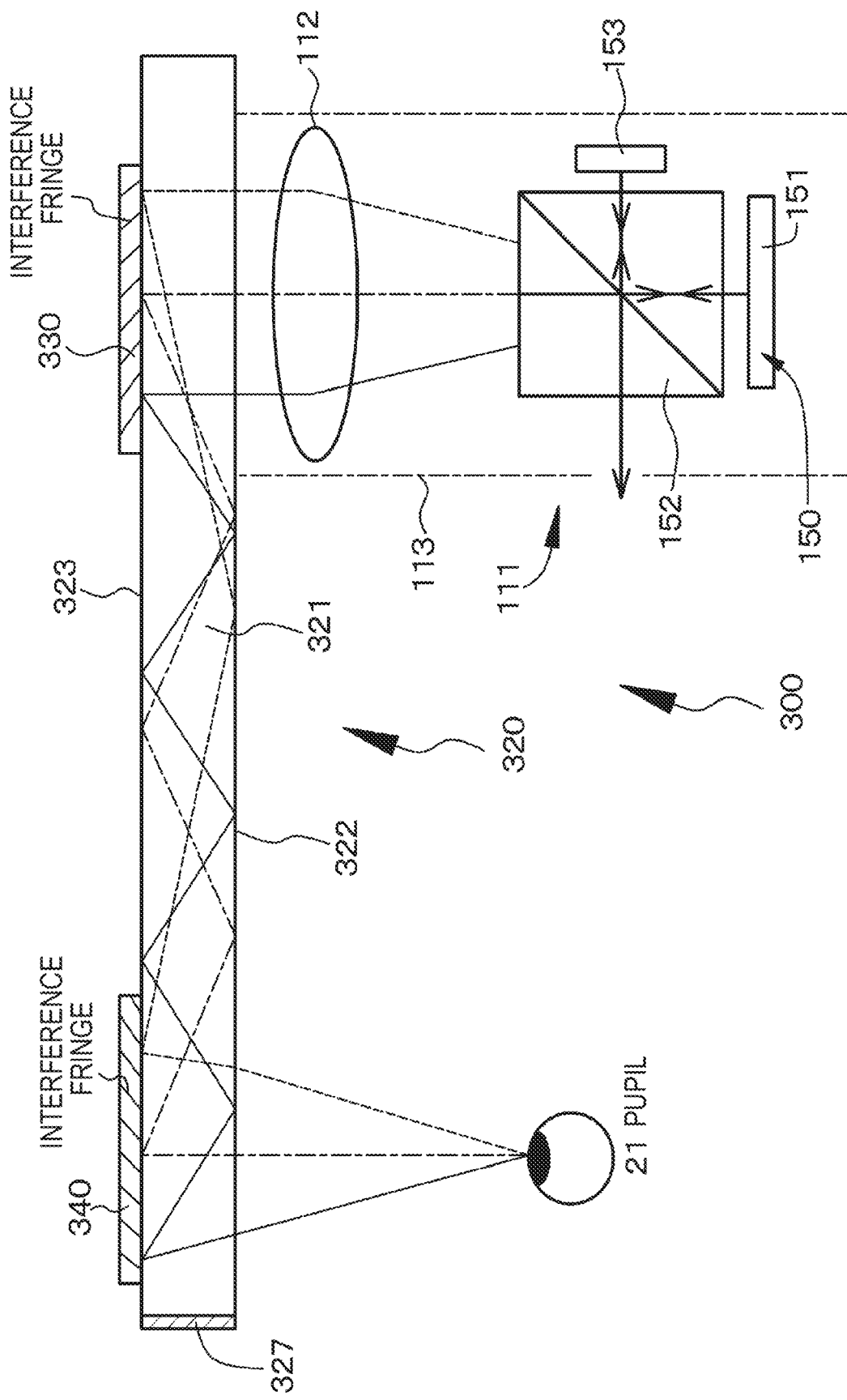
FIG. 11 is a conceptual diagram of an image display device in a display device of Embodiment 6, and illustrates a modification of the display device of Embodiment 4.

Embodiment 6 is a modification of Embodiment 1 and Embodiments 3 to 5, and relates to the second and third forms of image display devices. A conceptual diagram of an image display device (an image display device according to a modified example of Embodiment 1) in a display device of Embodiment 6 is illustrated in FIG. 10, a conceptual diagram of another image display device (an image display device according to a modified example of Embodiment 4) in a display device of Embodiment 6 is illustrated in FIG. 11,
and similarly to those of Embodiment 1 and Embodiments 3 to 5, the optical devices 120 and 320 of Embodiment 6 include (a) the light guide plates 121 and 321 that cause the incident light to propagate inside the light guide plates according to total reflection and then output the incident light, (b) the first polarizing units 130 and 330 that polarize the light incident on the light guide plates 121 and 321 so that the light incident on the light guide plates 121 and 321 is totally reflected inside the light guide plates 121 and 321, and (c) the second polarizing units 140 and 340 that polarize light propagating inside the light guide plates 121 and 321 according to total reflection so that part of light propagating inside the light guide plates 121 and 321 according to total reflection is output from the light guide plates 121 and 321.

The light receiving devices 127 and 327 are arranged at the end portions of the light guide plates 121 and 321 at the second polarizing units 140 and 340 side. Here, all light incident on the second polarizing units 140 and 340 is not necessarily output toward the observer, and part of light incident on the second polarizing units 140 and 340 finally passes through the second polarizing units 140 and 340 and reaches the light receiving devices 127 and 327.

Alternatively, in the image display devices 100, 200, 300, and 400 of Embodiment 6, the optical devices 120 and 320 include a light semi-reflecting member that reflects part of light output from the image forming devices 111 and 211 and transmits the remaining part, and the light receiving devices 127 and 327 detect the light passing through the light semi-reflecting member. Here, specifically, the light semi-reflecting member is formed of the second polarizing units 140 and 340.

The image display device and the display device of Embodiment 6 have substantially the same configuration and structure as the image display device and the display device of Embodiment 1 and Embodiments 3 to 5 except that arrangement positions of the light receiving devices 127 and 327 are different as described above, and thus a detailed description thereof is omitted.

Embodiment 7

Embodiment 7 is a modification of Embodiment 6, and relates to fifth and sixth forms of image display devices. In Embodiment 7, the image forming devices 111 and 211 include the light sources 153 and 251 formed of a GaN semiconductor laser element. Further, similarly to Embodiment 2, the wavelength of light output from the light sources 153 and 251 is controlled based on the detection results of the light receiving devices 127 and 327.

The image display device and the display device of Embodiment 7 have substantially the same configuration and structure as the image display device and the display device of Embodiment 6 except for the above-described points, and thus a detailed description thereof is omitted.

Embodiment 8

Figure 12:
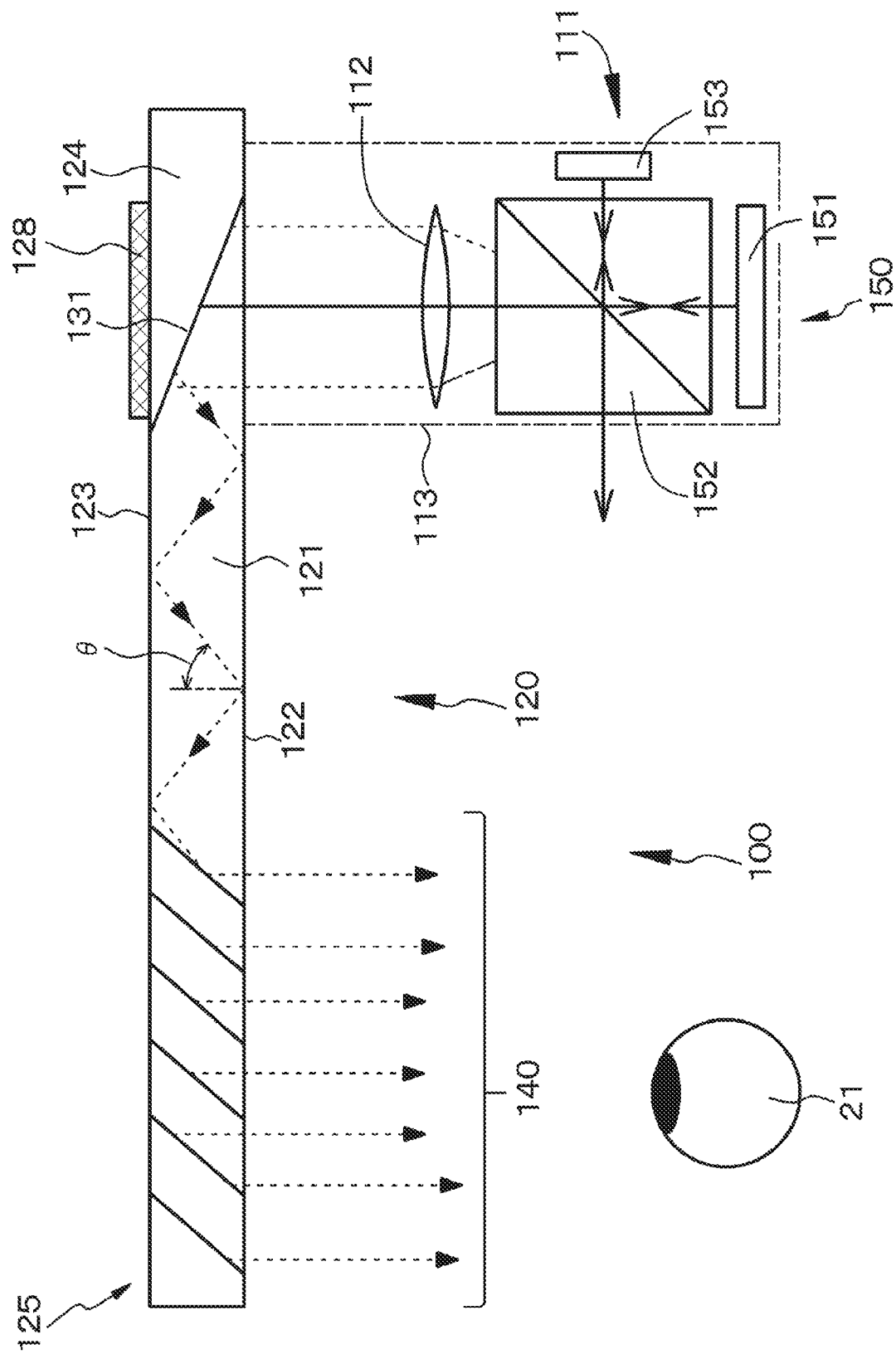
FIG. 12 is a conceptual diagram of an image display device in a display device of Embodiment 8, and illustrates a modification of the display device of Embodiment 1.
Figure 13:
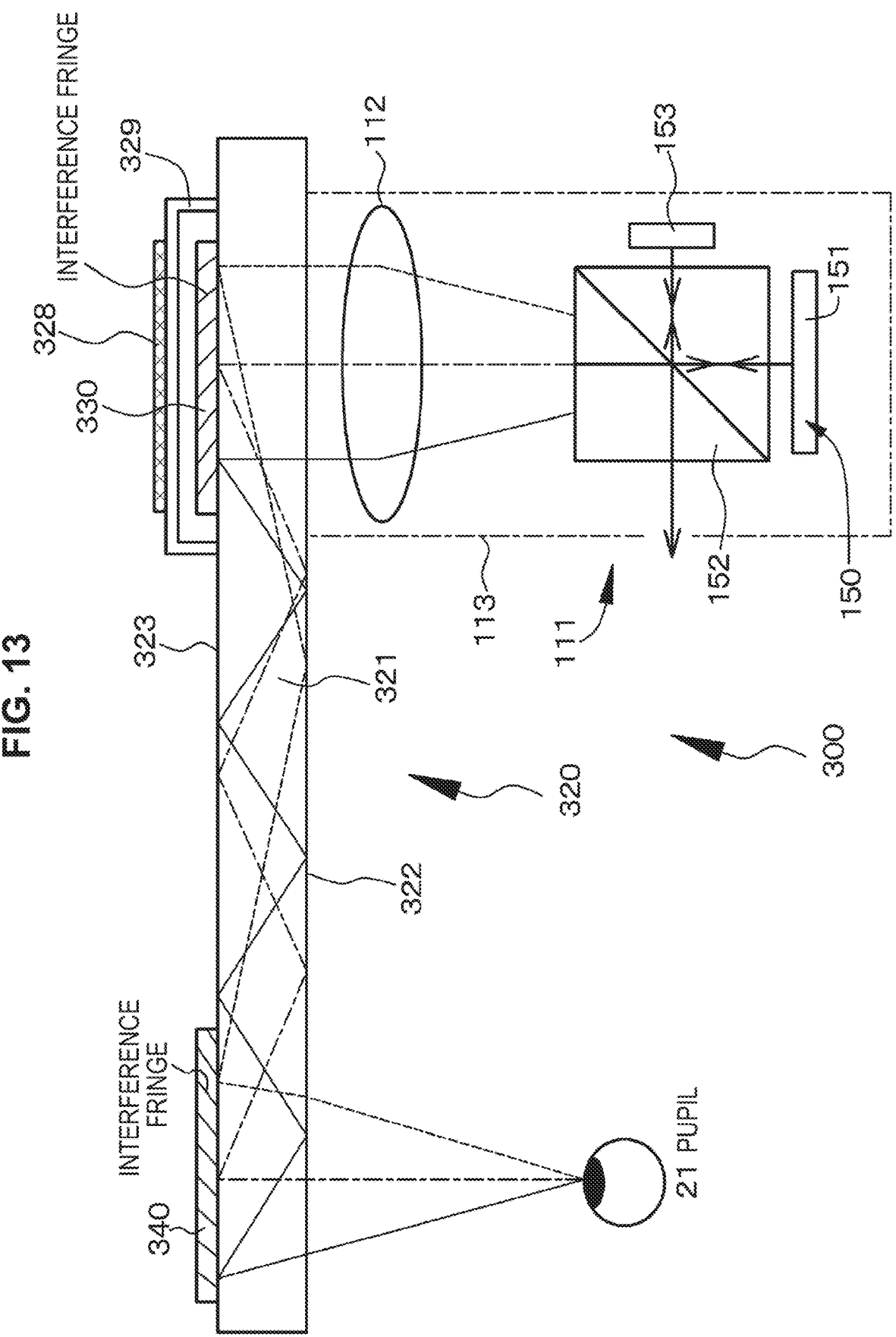
FIG. 13 is a conceptual diagram of an image display device in a display device of Embodiment 8, and illustrates a modification of the display device of Embodiment 4.

Embodiment 8 is also a modification of Embodiment 1 and Embodiments 3 to 5, and relates to the third form of image display device. A conceptual diagram of an image display device (an image display device according to a modified example of Embodiment 1) in a display device of Embodiment 8 is illustrated in FIG. 12, a conceptual diagram of another image display device (a image display device according to a modified example of Embodiment 4) in a display device of Embodiment 8 is illustrated in FIG. 13, and as illustrated in FIGS. 12 and 13, the optical devices 120 and 320 of Embodiment 8 include a light semi-reflecting member that reflects part of light output from the image forming devices 111 and 211 and transmits the remaining part, and the light receiving devices 128 and 328 detect the light passing through the light semi-reflecting member. Here, in Embodiment 8, the light semi-reflecting member is configured with the first polarizing unit 131, and the first polarizing unit 131 is configured with a semi-transmissive mirror that reflects part of light incident on the light guide plate 121. Alternatively, the light semi-reflecting member is configured with the first polarizing unit 330 formed of a reflective volume hologram diffraction grating functioning as a semi-transmissive mirror, similarly to Embodiment 4. The light receiving device 328 is mounted on a base 329 configured with a transparent member mounted on the light guide plate 321. The second polarizing units 140 and 340 transmit and reflect light propagating inside the light guide plates 121 and 321 according to total reflection a plurality of times, similarly to Embodiment 1 and Embodiments 3 to 5.

The image display device and the display device of Embodiment 8 have substantially the same configuration and structure as the image display devices and the display devices of Embodiment 1 and Embodiments 3 to 5 except that arrangement positions of the light receiving devices 128 and 328 are different and the first polarizing unit 131 is different as described above, and thus a detailed description thereof is omitted.

Embodiment 9

Embodiment 9 is a modification of Embodiment 8, and relates to the sixth form of image display device. In Embodiment 9, the image forming devices 111 and 211 include the light sources 153 and 251 formed of a GaN semiconductor laser element. Further, the wavelength of light output from the light sources 153 and 251 is controlled based on the detection results of the light receiving devices 128 and 328, similarly to Embodiment 2.

The image display device and the display device of Embodiment 9 have substantially the same configuration and structure as the image display device and the display device of Embodiment 8 except for the above-described points, and thus a detailed description thereof is omitted.

Embodiment 10

Figure 14:
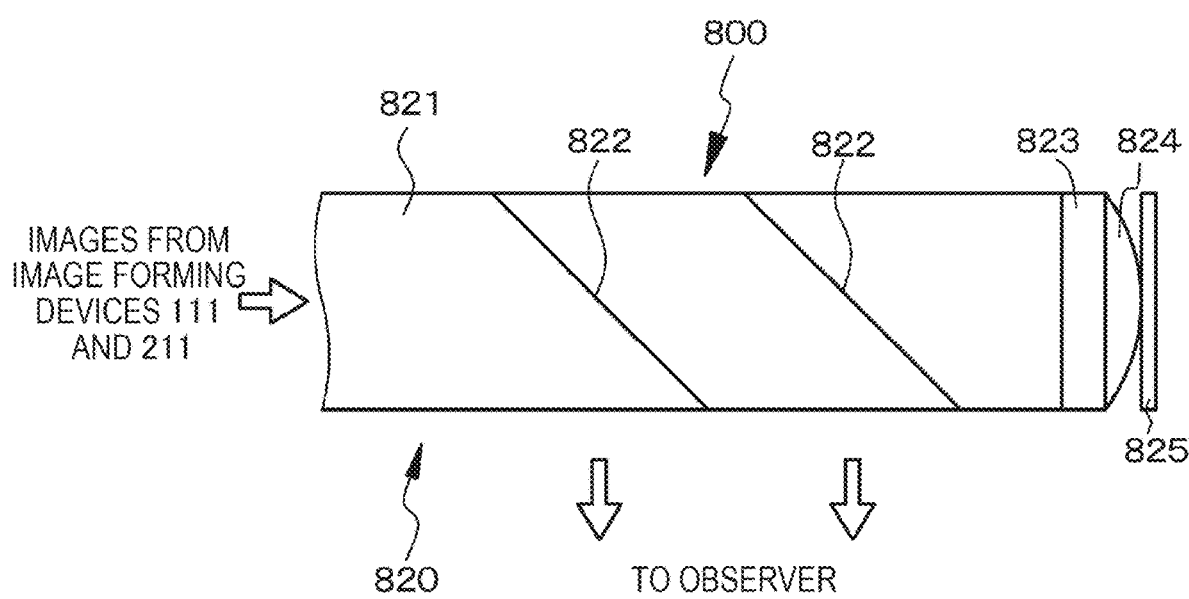
FIG. 14 is a conceptual diagram of a part of an optical device in a display device of Embodiment 10.

Embodiment 10 is a modification of the image display devices and the optical devices of the display device of Embodiments 1 to 9. FIG. 14 is a schematic diagram illustrating a part of the optical device 820 of the display device of Embodiment 10. The image display device 800 of Embodiment 10 is the third and sixth forms of image display devices.

In Embodiment 10, the light semi-reflecting member constituting the optical device 820 is configured with a concave mirror 824 that reflects light from the image forming devices 111 and 211. The optical device 820 further includes the semi-transmissive mirror 822 that outputs light reflected by the concave mirror 824 toward the observer and a quarter wavelength plate 823 that is arranged between the semi-transmissive mirror 822 and the concave mirror 824. The two semi-transmissive mirrors 822 are disposed inside the light guide plate 821. Here, the number of semi-transmissive mirrors 822 is not limited to "2," and, for example, may be "1." The light from the image forming devices 111 and 211 is incident from one end of the light guide plate 821. The quarter wavelength plate 823 and the concave mirror 824 are arranged on the other end of the light guide plate 821. The concave mirror 824 is configured to transmit part of light incident on the concave mirror 824, and the light receiving device 825 is arranged to receive the light passing through the concave mirror 824.

The image display device and the display device of Embodiment 10 have substantially the same configuration and structure as the image display device and the display device of Embodiments 1 to 9 except for the above-described points, and thus a detailed description thereof is omitted. Here, the concave mirror 824, the semi-transmissive mirror 822, and the quarter wavelength plate 823 may be supported by an appropriate support member, and the light guide plate 821 may be omitted. Further, a configuration in which the light from the image forming devices 111 and 211 arrives at the concave mirror 824 through the first polarizing units 130 and 330 may be provided, and a configuration in which the light from the image forming devices 111 and 211 arrives at the concave mirror 824 directly may be provided.

Embodiment 11

Figure 15:
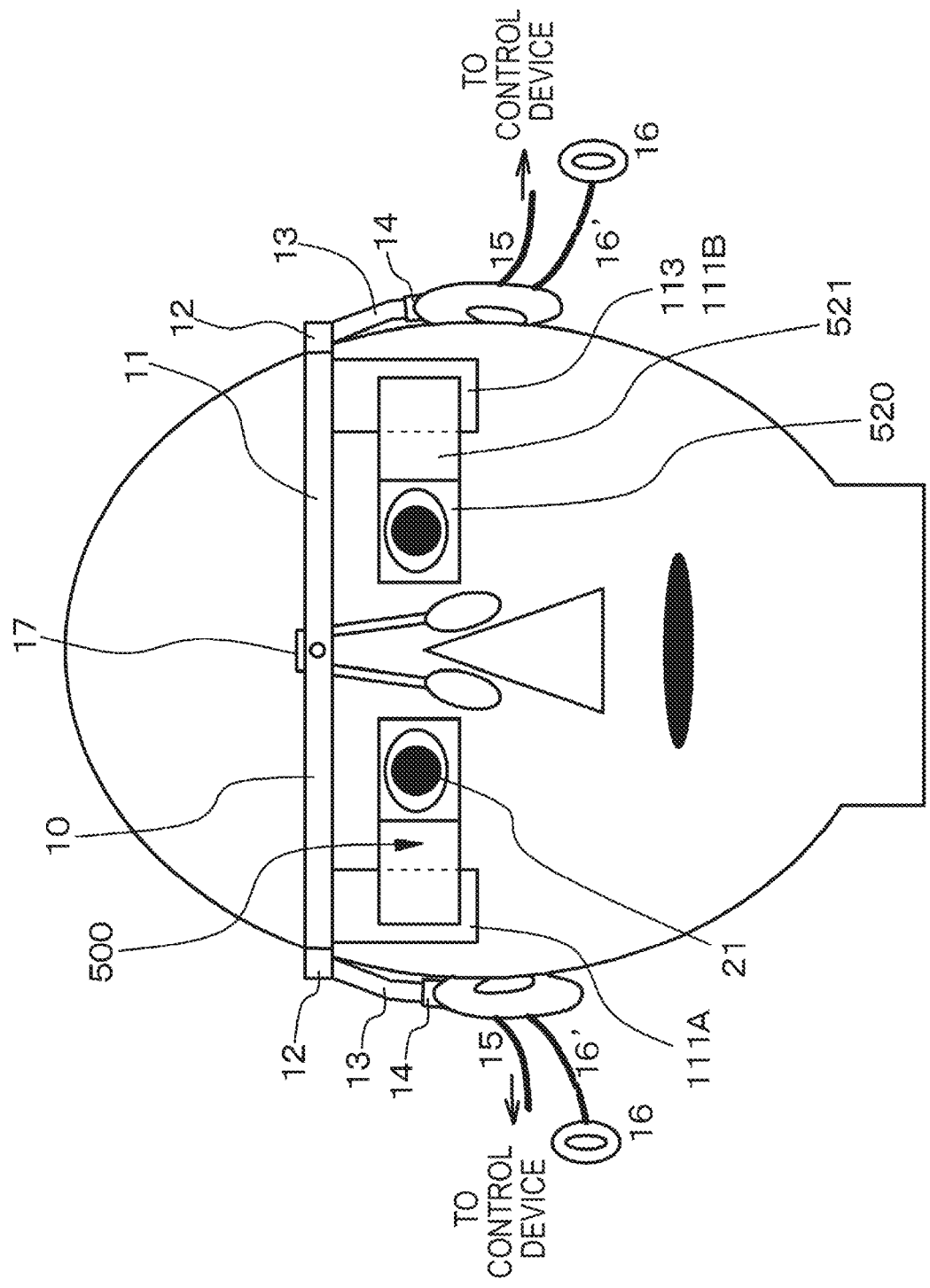
FIG. 15 is a schematic front view of a display device of Embodiment 11.
Figure 16:
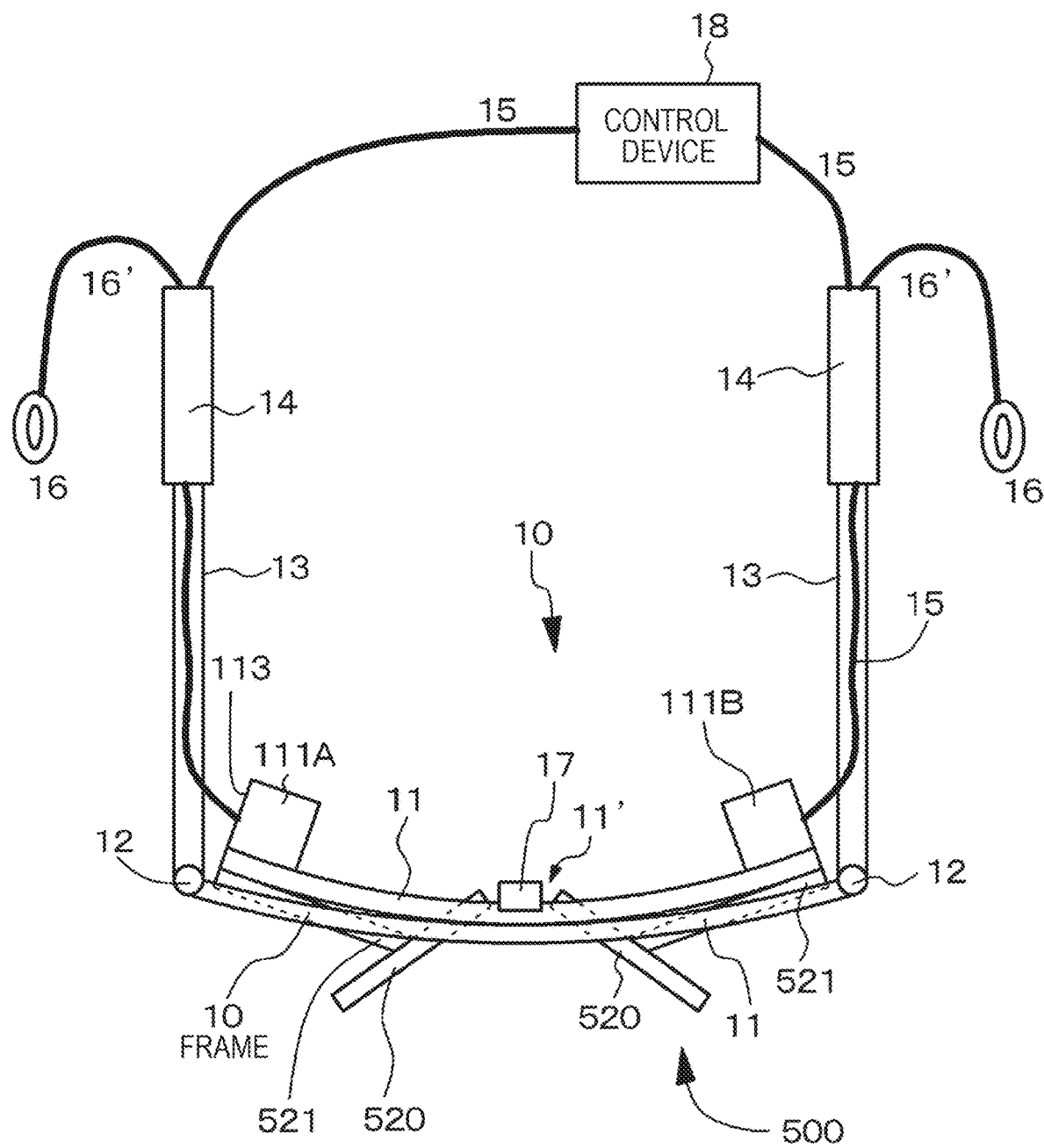
FIG. 16 is a schematic top view of the display device of Embodiment 11.

Embodiment 11 is also a modification of the image display device and the optical device of the display device of Embodiments 1 to 9. FIG. 15 is a schematic front view of a display device of Embodiment 11, and FIG. 16 is a schematic top view of the display device of Embodiment 11.

In Embodiment 11, the optical device 520 constituting the image display device 500 is configured with a semi-transmissive mirror on which light output from the image forming devices 111A and 111B is incident and from which the incident light is output toward a pupil 21 of the observer. The second polarizing units 140 and 340 are arranged in the optical device 520. Here, in Embodiment 11, a structure in which the light output from the image forming devices 111A and 111B propagates inside the transparent member 521 such as a glass plate or a plastic plate and is incident on the optical device 520 (the semi-transmissive mirror) is provided, but a structure in which the light output from the image forming devices 111A and 111B propagates through the air and is incident on the optical device 520 may be provided. Further, the image forming device 211 described in Embodiment 3 may be used as the image forming device. Further, a configuration in which the light from the image forming devices 111 and 211 arrives at the optical device 520 through the first polarizing units 130 and 330 may be provided, and a configuration in which the light from the image forming devices 111 and 211 arrives at the optical device 520 directly may be provided.

Each of the image forming devices 111A and 111B is mounted on a front portion 11, for example, using a screw. In addition, the member 521 is mounted on each of the image forming devices 111A and 111B, and the optical device 520 (semi-transmissive mirror) is mounted on the member 521. Because the display device of Embodiment 11 has substantially the same configuration and structure as the display devices of Embodiments 1 to 9 except for the differences described above, detailed description thereof is omitted.

The preferred embodiments of the present disclosure have been described above, but the present disclosure is not limited to the above embodiments. The configurations and structures of the display devices (head mounted displays)

and the image display devices described in the above embodiments are exemplary and can be appropriately changed. For example, a surface relief hologram (see US 20040062505A1) may be arranged on the light guide plate. In the optical device 320, the diffraction grating element may be configured with a transmissive diffraction grating element, and alternatively, a form in which one of the first polarizing unit and the second polarizing unit is configured with a reflective diffraction grating element, and the other is configured with a transmissive diffraction grating element may be provided. Alternatively, the diffraction grating element may be configured with a reflective blazed diffraction grating element. The detection of the light output from the image forming device by the light receiving device may be performed in conjunction with the measurement of the temperature of the light source constituting the image forming device.

Information or data related to an image to be displayed in the image forming device may be stored in the display device, or information and data may be recorded in a so-called cloud computer. In the latter case, the display device may be equipped with a communication device such as a mobile telephone or a smartphone, or, combined with the communication device so that various kinds of information or data can be transferred or exchanged between the cloud computer and the display device.

The embodiments have been described in connection with the example in which the image forming devices 111 and 211 display a single-color (for example, green) image, but the image forming devices 111 and 211 can display a color image, and in this case, the light source may be configured with, for example, respective light sources that output red, green, and blue. Specifically, for example, it is preferable to obtain white light by mixing red, green, and blue light output from a red light emitting element, a green light emitting element, and a blue light emitting element using the light pipe and performing luminance equalization. Here, when the light sources are configured with a red light emitting semiconductor laser element, a green light emitting semiconductor laser element, and a blue light emitting semiconductor laser element, for a red image formed by the red light emitting semiconductor laser element, a position of an image output from the image forming device may be controlled based on the detection result of the light receiving device, and for green and blue images formed by the green light emitting semiconductor laser element and the blue light emitting semiconductor laser element, a position of an image output from the image forming device may be controlled based on the detection result of the light receiving device, or the wavelength of light output from the light sources may be controlled based on the detection result of the light receiving device.

Figure 17:
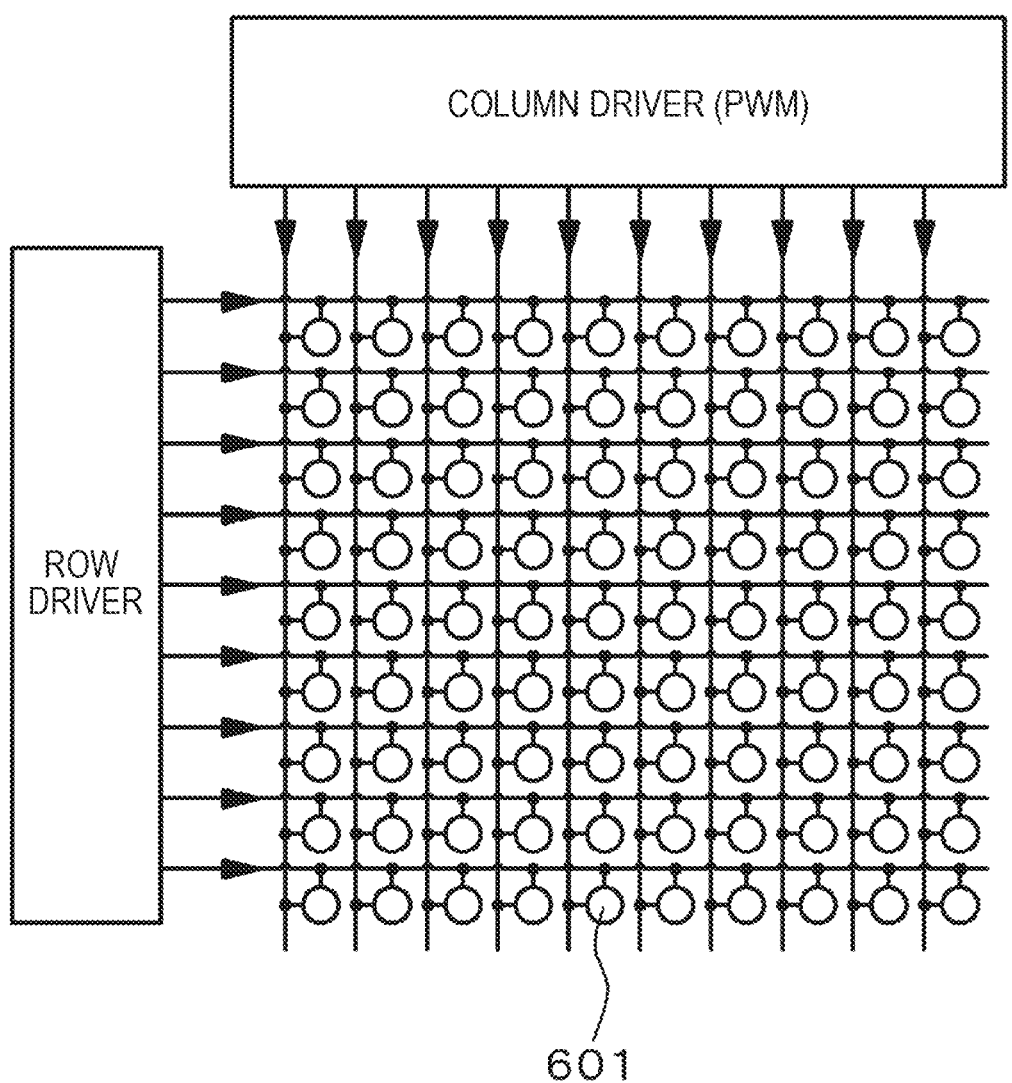
FIG. 17 is a conceptual diagram of a modified example of an image forming device.

As a modified example of the image forming device, for example, an image forming device of an active matrix type that includes a light emitting panel in which light emitting elements 601, each of which is configured with a semiconductor laser element, are arranged in a 2D matrix as in a conceptual diagram illustrated in FIG. 17, and displays an image by controlling light emitting/non-light-emitting states of the light emitting elements 601 and visualizing the light emitting states of the light emitting element 601 directly may be provided. Light output from the image forming device is incident on the light guide plates 121 and 321 through the collimating optical system 112. In the following description, the light emitting element is configured with, for example, a semiconductor laser element.

Figure 18:
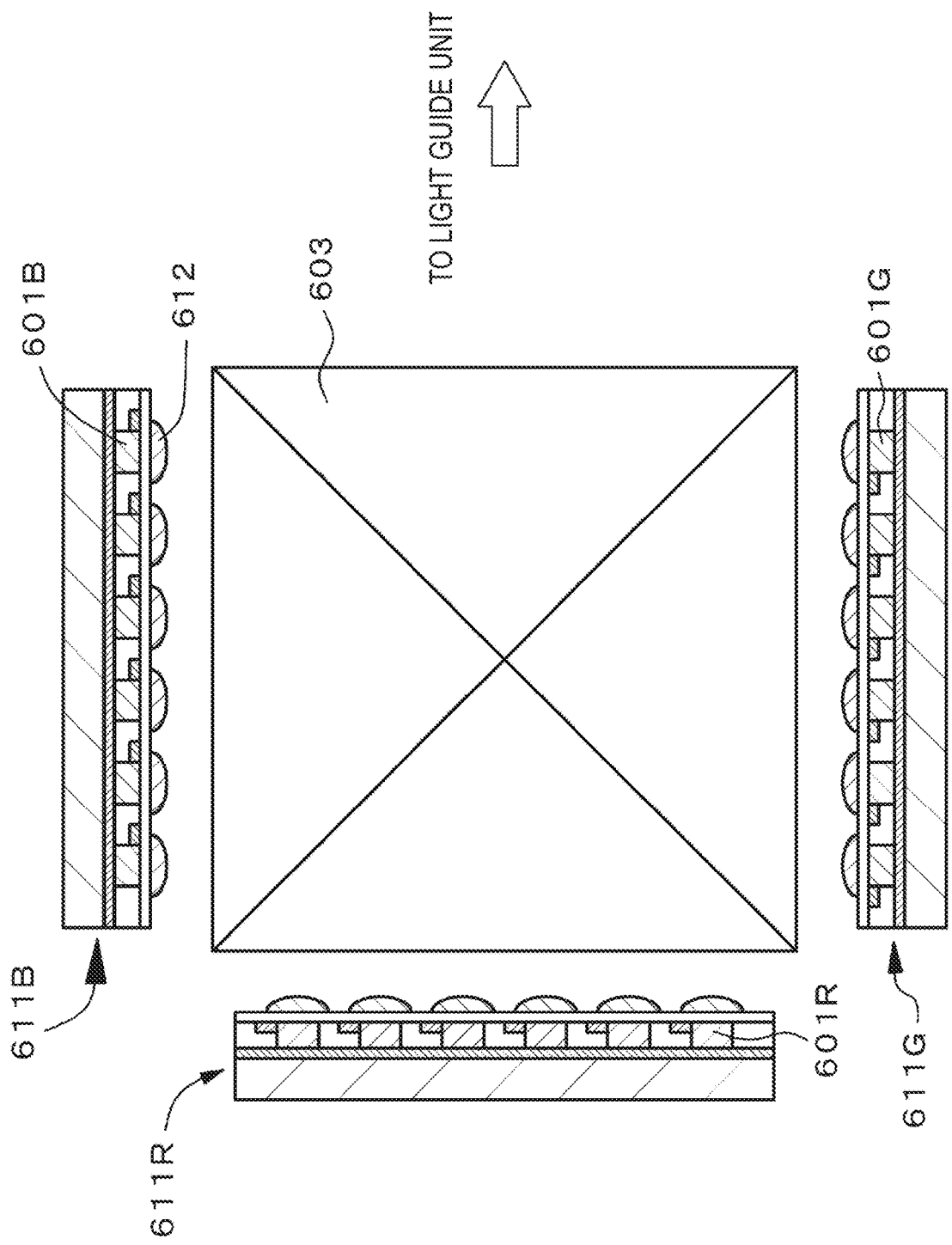
FIG. 18 is a conceptual diagram illustrating another modified example of an image forming device.

Alternatively, as illustrated in a conceptual diagram of FIG. 18, a color-display image forming device can include:

(α) a red light emitting panel 611R in which red light emitting elements 601R for emitting red light are arranged in a 2D matrix;

(β) a green light emitting panel 611G in which green light emitting elements 601G for emitting green light are arranged in a 2D matrix;

(γ) a blue light emitting panel 611B in which blue light emitting elements 601B for emitting blue light are arranged in a 2D matrix; and (δ) a unit (e.g., a dichroic prism 603) for integrating light output from the red, green, and blue light emitting panels 611R, 611G, and 611B into one optical path. Light emitting/non-light-emitting states of the red, green, and blue light emitting elements 601R, 601G, and 601B are controlled independently. Light output from this image forming device is also incident on the light guide plate 121 or 321 via the collimating optical system 112. Reference numeral 612 denotes microlenses for condensing light output from the light emitting elements.

Figure 19:
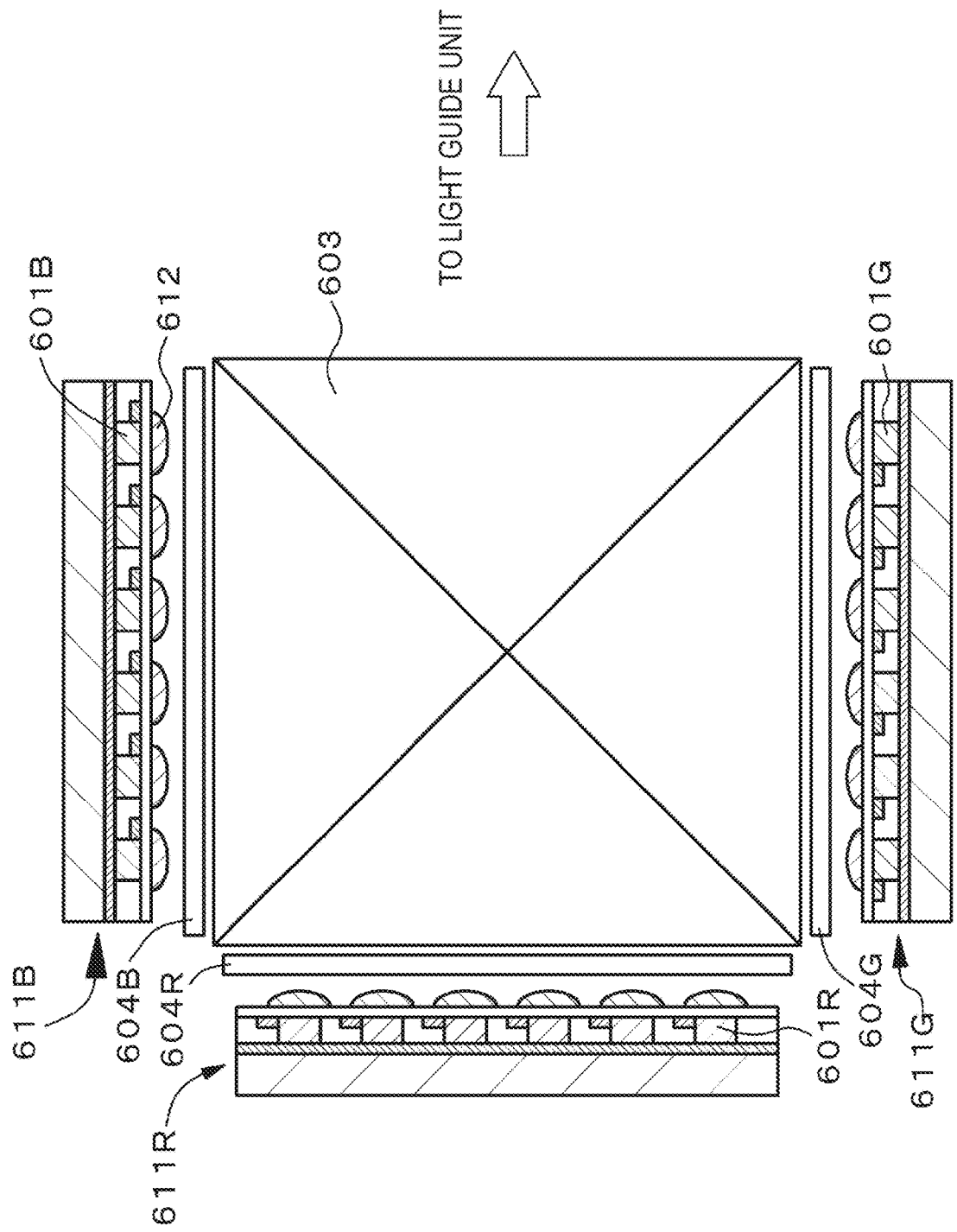
FIG. 19 is a conceptual diagram illustrating another modified example of an image forming device.

Alternatively, a conceptual view of an image forming device including light emitting panels 611R, 611G, and 611B in which light emitting elements 601R, 601G, and 601B are arranged in a 2D matrix is illustrated in FIG. 19. Light output from the light emitting panels 611R, 611G, and 611B is incident on a dichroic prism 603 after passage/non-passage thereof is controlled by light passage control devices 604R, 604G, and 604B. The optical paths of the light beams are integrated into one optical path, and the light beams are incident on the light guide plate 121 or 321 via the collimating optical system 112.

Figure 20:
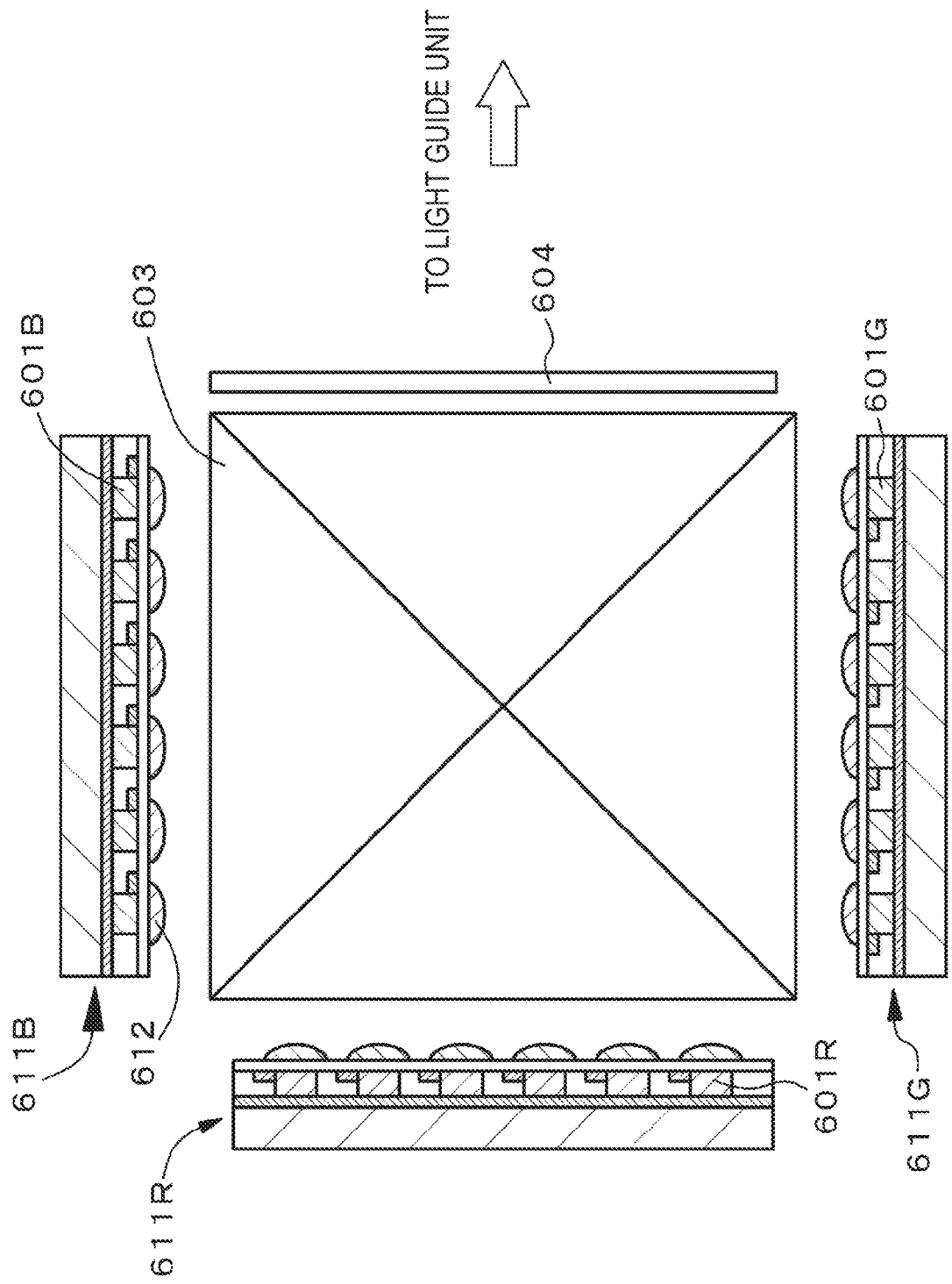
FIG. 20 is a conceptual diagram illustrating another modified example of an image forming device.

Alternatively, a conceptual view of an image forming device including light emitting panels 611R, 611G, and 611B and the like in which light emitting elements 601R, 601G, and 601B are arranged in a 2D matrix is illustrated in FIG. 20. Light output from the light emitting panels 611R, 611G, and 611B is incident on a dichroic prism 603 and optical paths thereof are integrated into one optical path. Passage/non-passage of the light output from the dichroic prism 603 is controlled by a light passage control device 604, and the light is incident on the light guide plate 121 or 321 via the collimating optical system 112.

Figure 21:
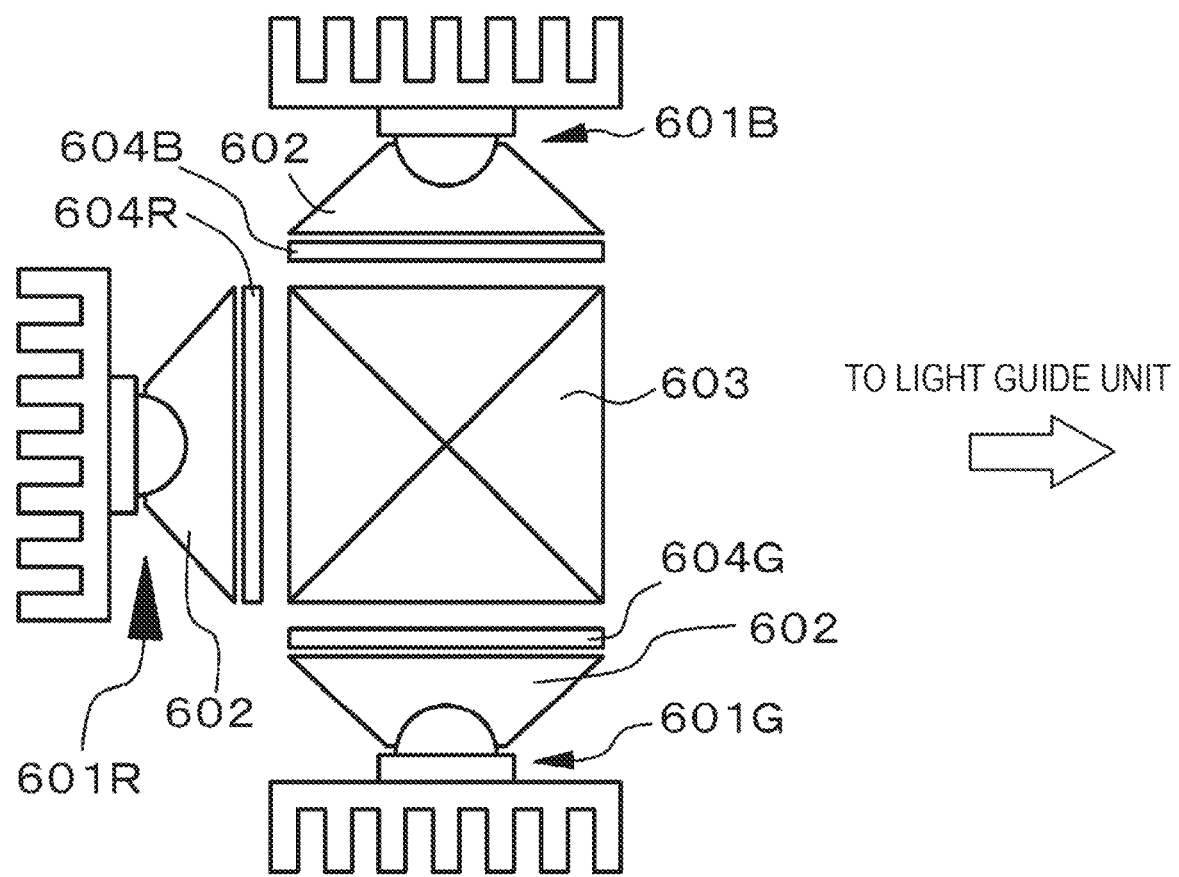
FIG. 21 is a conceptual diagram illustrating another modified example of an image forming device.
Figure 22:
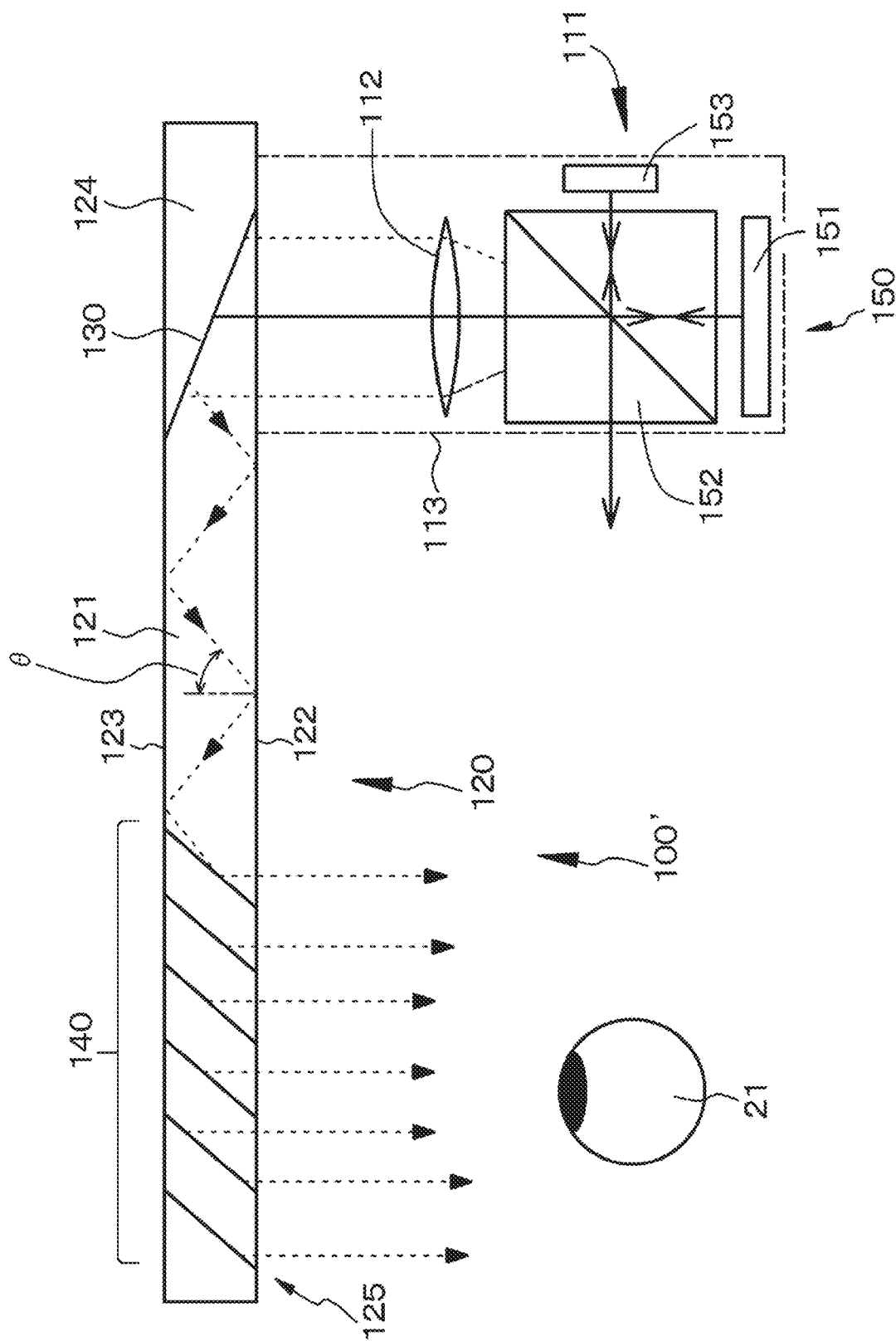
FIG. 22 is a conceptual diagram of an image display device in a display device according to a related art.
Figure 23:
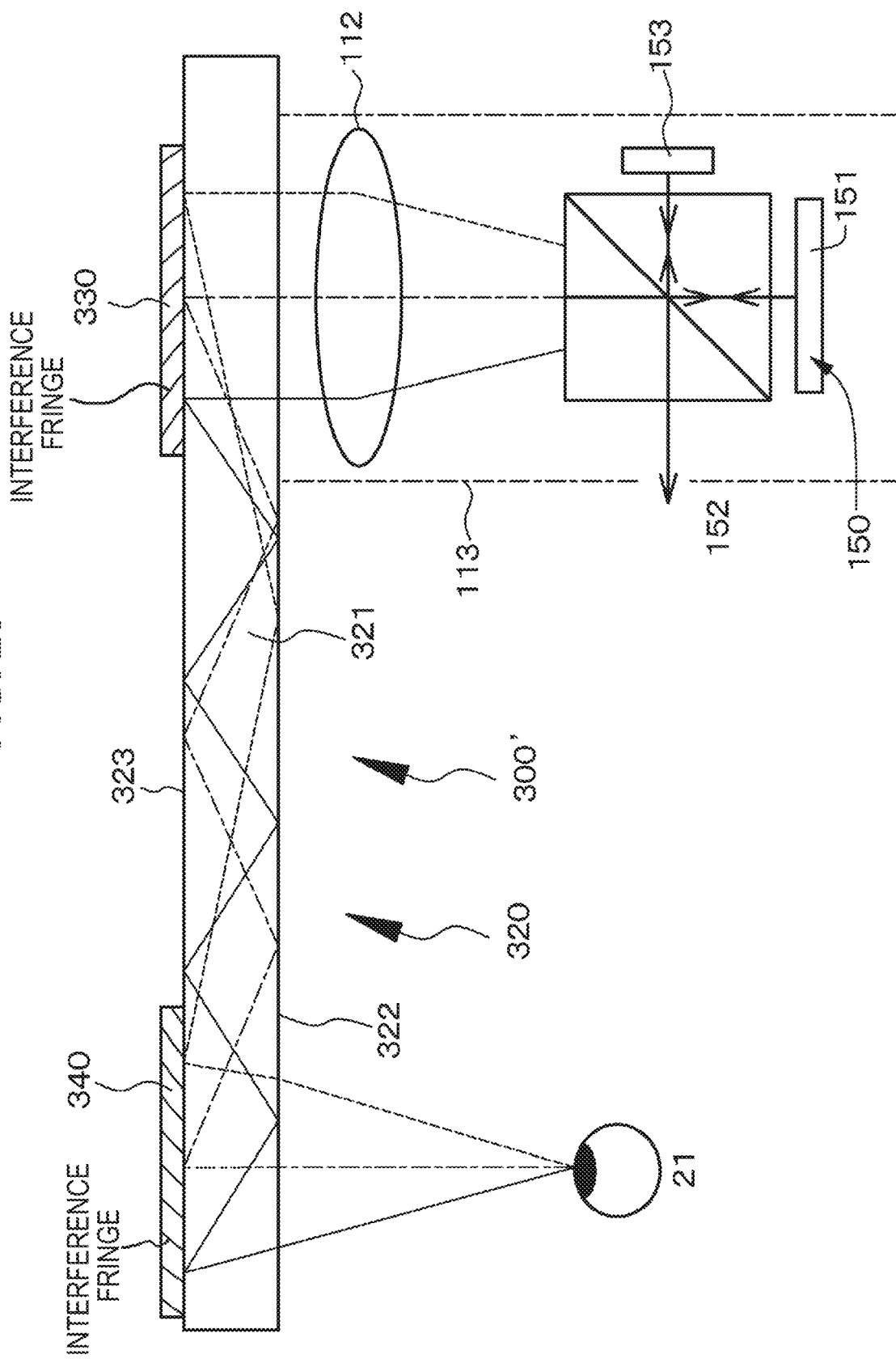
FIG. 23 is a conceptual diagram of an image display device in a modified example of the display device according to the related art.

Alternatively, as illustrated in FIG. 21, an image forming device can include a light emitting element 601R for emitting red light, a light passage control device (e.g., an LCD device 604R), which is a type of light valve for controlling passage/non-passage of the red light output from the light emitting element 601R, a light emitting element 601G for emitting green light, a light passage control device (e.g., an LCD device 604G), which is a type of light valve for controlling passage/non-passage of the green light output from the light emitting element 601G, a light emitting element 601B for emitting blue light, a light passage control device (e.g., an LCD device 604B), which is a type of light valve for controlling passage/non-passage of the blue light output from the light emitting element 601B, light guide members 602 for guiding the light output from the light emitting elements 601R, 601G, and 601B, and a unit (e.g., a dichroic prism 603) for integrating the optical paths of the light into one optical path. The light output from the dichroic prism 603 is incident on the light guide plate 121 or 321 via the collimating optical system 112.

Additionally, the present disclosure may also be configured as below.

[A01] «Image Display Device»

An image display device including:
(A) an image forming device;
(B) an optical device configured to receive incident light output from the image forming device and output the incident light; and
(C) a light receiving device configured to detect the light output from the image forming device.

[A02] «Image Display Device According to First Embodiment»

The image display device according to [A01],
wherein the optical device includes
(a) a light guide plate configured to cause the incident light to propagate inside the light guide plate according to total reflection and then output the incident light,
(b) a first polarizing unit configured to polarize the light incident on the light guide plate so that the light incident on the light guide plate is totally reflected inside the light guide plate, and
(c) a second polarizing unit configured to polarize the light propagating inside the light guide plate according to total reflection to output part of light propagating inside the light guide plate according to total reflection from the light guide plate,
the second polarizing unit including
a first portion that polarizes the light propagating inside the light guide plate according to total reflection toward an observer, and
a second portion that polarizes the light propagating inside the light guide plate according to total reflection toward the light receiving device.

[A03] «Image Display Device According to Second Embodiment»

The image display device according to [A01],
wherein the optical device includes
(a) a light guide plate configured to cause the incident light to propagate inside the light guide plate according to total reflection and then output the incident light,
(b) a first polarizing unit configured to polarize the light incident on the light guide plate so that the light incident on the light guide plate is totally reflected inside the light guide plate, and
(c) a second polarizing unit configured to polarize the light propagating inside the light guide plate according to total reflection to output part of light propagating inside the light guide plate according to total reflection from the light guide plate, and
wherein the light receiving device is arranged on an end portion of the light guide plate at a side of the second polarizing unit.

[A04]

The image display device according to [A02] or [A03],
wherein the second polarizing unit is configured with a reflective volume hologram diffraction grating.

[A05]

The image display device according to any one of [A02] to [A04], wherein the first polarizing unit is configured with a reflecting mirror, a semi-transmissive mirror, or a reflective volume hologram diffraction grating.

[A06] «Image Display Device According to Third Embodiment»

The image display device according to [A01],
wherein the optical device includes a light semi-reflecting member that reflects part of light output from the image forming device and transmits a remaining part, and
wherein the light receiving device detects the light passing through the light semi-reflecting member.

[A07]

The image display device according to [A06] wherein the light semi-reflecting member is configured with a semi-transmissive mirror, a reflective volume hologram diffraction grating, or a semi-transmissive concave mirror.

[A8]

The image display device according to [A01],
wherein the light receiving device is optically connected to the optical device.

[A09]

The image display device according to any one of [A01] to [A08],
wherein an operation of the image forming device is controlled based on a detection result of the light receiving device.

[A10]

The image display device according to [A09],
wherein a position of an image to be output from the image forming device is controlled based on the detection result of the light receiving device.

[A11]

The image display device according to [A09] wherein a signal for compensating for distortion occurring in an image output from the optical device is transmitted to the image forming device based on the detection result of the light receiving device.

[A12] «Image Display Device According to Fourth Embodiment»

The image display device according to [A01],
wherein the image forming device includes a light source configured with a GaN semiconductor laser element,
wherein the optical device includes
(a) a light guide plate configured to cause the incident light to propagate inside the light guide plate according to total reflection and then output the incident light,
(b) a first polarizing unit configured to polarize the light incident on the light guide plate so that the light incident on the light guide plate is totally reflected inside the light guide plate, the first polarizing unit being configured with a reflecting mirror or a semi-transmissive mirror, and
(c) a second polarizing unit configured to polarize the light propagating inside the light guide plate according to total reflection to output part of light propagating inside the light guide plate according to total reflection from the light guide plate, the second polarizing unit being configured with a reflective volume hologram diffraction grating,
the second polarizing unit including
a first portion that polarizes the light propagating inside the light guide plate according to total reflection toward an observer, and
a second portion that polarizes the light propagating inside the light guide plate according to total reflection toward the light receiving device, and
wherein a wavelength of light output from the light source is controlled based on a detection result of the light receiving device.

[A13] «Image Display Device According to Fifth Embodiment»

The image display device according to [A01],
wherein the image forming device includes a light source configured with a GaN semiconductor laser element, wherein the optical device includes
(a) a light guide plate configured to cause the incident light to propagate inside the light guide plate according to total reflection and then output the incident light,
(b) a first polarizing unit configured to polarize the light incident on the light guide plate so that the light incident on the light guide plate is totally reflected inside the light guide plate, the first polarizing unit being configured with a reflecting mirror or a semi-transmissive mirror, and
(c) a second polarizing unit configured to polarize the light propagating inside the light guide plate according to total reflection to output part of light propagating inside the light guide plate according to total reflection from the light guide plate, the second polarizing unit being configured with a reflective volume hologram diffraction grating,
wherein the light receiving device is arranged on an end portion of the light guide plate at a side of the second polarizing unit, and
wherein a wavelength of light output from the light source is controlled based on a detection result of the light receiving device.

[A14]«Image Display Device According to Sixth Embodiment»
The image display device according to [A01],
wherein the image forming device includes a light source configured with a GaN semiconductor laser element,
wherein the optical device includes a light semi-reflecting member that reflects part of light output from the image forming device and transmits a remaining part, and
wherein the light receiving device detects the light passing through the light semi-reflecting member, and controls a wavelength of light output from the light source based on a detection result.

[A15]
The image display device according to [A14] wherein the light semi-reflecting member is configured with a semi-transmissive mirror, a reflective volume hologram diffraction grating, or a semi-transmissive concave mirror.

[A16]
The image display device according to any one of [A01] to [A15],
wherein the light receiving device is configured in a manner that light receiving elements are arranged one-dimensionally or in a manner that light receiving elements are arranged in a two dimensional (2D) matrix.

[B01]«Display Device»
A display device including:
(I) a frame to be mounted on a head of an observer; and
(II) an image display device mounted on the frame,
the image display device including
  (A) an image forming device,
  (B) an optical device configured to receive incident light output from the image forming device and outputs the incident light, and
  (C) a light receiving device configured to detect the light output from the image forming device.

[B02]«Display Device»
A display device, including
(I) a frame mounted on a head of an observer, and
(II) an image display device mounted on the frame,
wherein the image display device is configured with the image display device according to one of [A01] to [A16].

[C01]
An image display device including:
(A) an image forming device configured to include a liquid crystal display device and a light source;
(B) a light guide plate configured to propagate light output from the image forming device; and
(C) a light receiving device configured to detect part of light output from the image forming device,
wherein a wavelength of light output from the light source is controlled based on a detection result of the light receiving device.

[C02]
The image display device according to [C01],
wherein the light receiving device is arranged on an end portion of the light guide plate.

[C03]
The image display device according to any one of [A01] to [A16], further including:
a light semi-reflecting member that reflects part of light output from the image forming device and transmits a remaining part,
wherein the light receiving device detects the light passing through the light semi-reflecting member.

It should be understood by those skilled in the art that various modifications, combinations, sub-combinations and alterations may occur depending on design requirements and other factors insofar as they are within the scope of the appended claims or the equivalents thereof.

What is claimed is:
1. An image display device comprising:
an image forming device;
an optical device configured to receive incident light output from the image forming device and output the incident light, the optical device including a light guide plate configured to cause the incident light to propagate inside the light guide plate according to total reflection and then output the incident light;
a light receiving device arranged on a first surface of the light guide plate and configured to detect the light output from the optical device; and
a control device configured to control an image output from the image forming device based on a detection result from the light receiving device,
wherein the optical device further includes:
  a first polarizing unit arranged on a second surface of the light guide plate and configured to polarize the light incident on the light guide plate so that the light incident on the light guide plate is totally reflected inside the light guide plate, and
  a second polarizing unit arranged on the second surface of the light guide plate and configured to polarize the light propagating inside the light guide plate according to total reflection to output the light propagating inside the light guide plate according to total reflection from the light guide plate,
wherein the light receiving device is configured to detect an occurrence of an abnormality in the image display device based on an image detected by the light receiving device, the image being detected based on the part of the light received by the light receiving device from the second polarizing unit, and
wherein the first surface of the light guide plate and the second surface of the light guide plate face each other.

2. The image display device according to claim 1,
wherein the light receiving device is arranged on an end portion of the light guide plate at a side of the second polarizing unit.

3. The image display device according to claim 1,
wherein the optical device includes a light semi-reflecting member that reflects part of light output from the image forming device and transmits a remaining part, and
wherein the light receiving device detects the light passing through the light semi-reflecting member.

4. The image display device according to claim 1,
wherein the light receiving device is optically connected to the optical device.

5. The image display device according to claim 1,
wherein an operation of the image forming device is controlled based on the detection of the occurrence of the abnormality in the image display device by the light receiving device.

6. The image display device according to claim 5,
wherein a position of an image to be output from the image forming device is controlled based on the detection of the occurrence of the abnormality in the image display device by the light receiving device.

7. The image display device according to claim 1,
wherein the image forming device includes a light source configured with a GaN semiconductor laser element,
wherein the optical device includes a light semi-reflecting member that reflects part of light output from the image forming device and transmits a remaining part, and
wherein the light receiving device detects the light passing through the light semi-reflecting member, and controls a wavelength of light output from the light source based on the detection result.

8. The image display device according to claim 1,
wherein the light receiving device is configured in a manner that light receiving elements are arranged one-dimensionally or in a manner that light receiving elements are arranged in a two dimensional (2D) matrix.

9. The image display device according to claim 1, wherein the detection of the occurrence of the abnormality in the image display device comprises detection of a deviation in a position of an image output from the image forming device and a position of the image detected by the light receiving device.

10. The image display device according to claim 1, wherein the second polarizing unit comprises:
a first portion configured to polarize part of the light propagating inside the light guide plate according to total reflection towards an observer, and
a second portion configured to polarize part of the light propagating inside the light guide plate according to total reflection towards the light receiving device arranged on the first surface of the light guide plate.

11. A display device comprising:
a frame to be mounted on a head of an observer; and
an image display device mounted on the frame, the image display device including:
an image forming device,
an optical device configured to receive incident light output from the image forming device and output the incident light, the optical device including a light guide plate configured to cause the incident light to propagate inside the light guide plate according to total reflection and then output the incident light,
a light receiving device arranged on a first surface of the light guide plate and configured to detect the light output from the optical device; and
a control device configured to control an image output from the image forming device based on a detection result from the light receiving device,
wherein the optical device further includes:
a first polarizing unit arranged on a second surface of the light guide plate and configured to polarize the light incident on the light guide plate so that the light incident on the light guide plate is totally reflected inside the light guide plate, and
a second polarizing unit arranged on the second surface of the light guide plate and configured to polarize the light propagating inside the light guide plate according to total reflection to output the light propagating inside the light guide plate according to total reflection from the light guide plate,
wherein the light receiving device is configured to detect an occurrence of an abnormality in the image display device based on an image detected by the light receiving device, the image being detected based on the part of the light received by the light receiving device from the second polarizing unit, and
wherein the first surface of the light guide plate and the second surface of the light guide plate face each other.

12. An image display device comprising:
an image forming device configured to include a liquid crystal display device and a light source;
a light guide plate configured to propagate light output from the image forming device; and
a light receiving device arranged on a first surface of the light guide plate and configured to detect part of light output from the optical device; and
a control device configured to control an image output from the image forming device based on a detection result from the light receiving device,
wherein a first polarizing unit is disposed inside the light guide plate, is arranged on a second surface of the light guide plate, and is configured to polarize the light incident on the light guide plate so that the light incident on the light guide plate is totally reflected inside the light guide plate, and
a second polarizing unit is disposed inside the light guide plate, is arranged on the second surface of the light guide plate, and is configured to polarize the light propagating inside the light guide plate according to total reflection to output the light propagating inside the light guide plate according to total reflection from the light guide plate,
wherein the light receiving device is configured to detect an occurrence of an abnormality in the image display device based on an image detected by the light receiving device, the image being detected based on the part of the light received by the light receiving device from the second polarizing unit,
wherein a wavelength of light output from the light source is controlled based on the detection of the occurrence of the abnormality in the image display device by the light receiving device, and
wherein the first surface of the light guide plate and the second surface of the light guide plate face each other.

13. The image display device according to claim 12,
wherein the light receiving device is arranged on an end portion of the light guide plate.

14. The image display device according to claim 12, further comprising:

a light semi-reflecting member that reflects part of light output from the image forming device and transmits a remaining part, wherein the light receiving device detects the light passing through the light semi-reflecting member.

15. The image display device according to claim 1, wherein a wavelength of light output from the image forming device is controlled based on the detection of the occurrence of the abnormality in the image display device by the light receiving device.

16. The display device according to claim 11, wherein a wavelength of light output from the image forming device is controlled based on the detection of the occurrence of the abnormality in the image display device by the light receiving device.

* * * * *